United States Patent
Jung et al.

(10) Patent No.: US 7,958,051 B2
(45) Date of Patent: *Jun. 7, 2011

(54) USING PAYMENT MODE RANKINGS RESPONSIVE TO ITEM ATTRIBUTES

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Lowell L. Wood, Jr., Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/364,502

(22) Filed: Feb. 28, 2006

(65) Prior Publication Data

US 2007/0203831 A1 Aug. 30, 2007

Related U.S. Application Data

(63) Continuation-in-part of application No. 11/364,501, filed on Feb. 28, 2006.

(51) Int. Cl.
*G06Q 40/00* (2006.01)
(52) U.S. Cl. .......................... 705/44; 705/39
(58) Field of Classification Search .............. 705/38, 705/39, 2, 40, 26; 463/25; 707/3; 194/217; 235/379, 380

See application file for complete search history.

(56) References Cited

U.S. PATENT DOCUMENTS

| | | | | |
|---|---|---|---|---|
| 4,393,269 A * | 7/1983 | Konheim et al. | | 705/75 |
| 5,177,688 A * | 1/1993 | Rentschler et al. | | 705/8 |
| 5,563,933 A | 10/1996 | August et al. | | |
| 5,734,711 A * | 3/1998 | Kleffner | | 379/323 |
| 5,899,981 A | 5/1999 | Taylor et al. | | |
| 6,119,946 A | 9/2000 | Teicher | | |
| 6,442,526 B1 | 8/2002 | Vance et al. | | |
| 6,467,685 B1 | 10/2002 | Teicher | | |
| 6,477,514 B1 | 11/2002 | Gil et al. | | |
| 6,514,139 B2 * | 2/2003 | Levitan | | 463/16 |
| 6,826,473 B1 | 11/2004 | Burch et al. | | |
| 7,058,165 B2 | 6/2006 | Koskinen et al. | | |
| 7,181,438 B1 * | 2/2007 | Szabo | | 705/14 |
| 7,209,897 B2 | 4/2007 | Ghiloni et al. | | |
| 7,309,003 B2 | 12/2007 | Algiene et al. | | |
| 7,331,518 B2 | 2/2008 | Rable | | |
| 7,349,860 B1 | 3/2008 | Wallach et al. | | |
| 7,353,195 B2 * | 4/2008 | Inoue et al. | | 705/30 |
| 7,366,921 B2 * | 4/2008 | Ranganathan | | 713/300 |
| 7,373,339 B2 * | 5/2008 | Hotz et al. | | 705/30 |
| 2001/0032182 A1 | 10/2001 | Kumar et al. | | |
| 2001/0034686 A1 * | 10/2001 | Eder | | 705/36 |
| 2001/0049672 A1 | 12/2001 | Moore et al. | | |

(Continued)

OTHER PUBLICATIONS

Biggs, Maggie "New paradigm for b-to-b—Bill presentment and payment based on Web standards cuts costs, improves flexibility compared with traditional methods." Oct. 22, 2001 InfoWorld , 23 , 43 , 51.*

(Continued)

*Primary Examiner* — Kelly Campen

(57) ABSTRACT

Methods and systems for obtaining at least some mode rankings responsive to one or more categorical attributes of a first item and to one or more payment mode use constraints, and transmitting at least an indication of a payment mode.

29 Claims, 27 Drawing Sheets

U.S. PATENT DOCUMENTS

| | | | |
|---|---|---|---|
| 2002/0007330 A1 | 1/2002 | Kumar et al. | |
| 2002/0013728 A1 | 1/2002 | Wilkman | |
| 2002/0016771 A1 | 2/2002 | Carothers et al. | |
| 2002/0016786 A1* | 2/2002 | Pitkow et al. | 707/3 |
| 2002/0023020 A1* | 2/2002 | Kenyon et al. | 705/26 |
| 2002/0023053 A1 | 2/2002 | Szoc et al. | |
| 2002/0032609 A1 | 3/2002 | Wilkman | |
| 2002/0032905 A1 | 3/2002 | Sherr et al. | |
| 2002/0039923 A1* | 4/2002 | Cannon et al. | 463/42 |
| 2002/0077978 A1 | 6/2002 | O'Leary et al. | |
| 2002/0111853 A1 | 8/2002 | O'Ryan | |
| 2002/0116331 A1 | 8/2002 | Cataline et al. | |
| 2002/0138424 A1 | 9/2002 | Coyle | |
| 2002/0152158 A1 | 10/2002 | Paleiov et al. | |
| 2002/0187774 A1 | 12/2002 | Ritter et al. | |
| 2003/0028883 A1 | 2/2003 | Billmaier et al. | |
| 2003/0055755 A1 | 3/2003 | Shuder et al. | |
| 2003/0060186 A1 | 3/2003 | Lehto | |
| 2003/0093376 A1 | 5/2003 | Silverbrook et al. | |
| 2003/0132288 A1 | 7/2003 | Fulcher et al. | |
| 2003/0140004 A1 | 7/2003 | O'Leary et al. | |
| 2003/0163425 A1 | 8/2003 | Cannon, Jr. | |
| 2003/0171985 A1 | 9/2003 | Prabhu et al. | |
| 2003/0177101 A1 | 9/2003 | Ferris | |
| 2003/0204457 A1 | 10/2003 | Arias | |
| 2003/0212996 A1 | 11/2003 | Wolzien | |
| 2004/0049456 A1 | 3/2004 | Dreyer | |
| 2004/0077334 A1 | 4/2004 | Joyce et al. | |
| 2004/0101117 A1 | 5/2004 | Koskinen et al. | |
| 2004/0117302 A1 | 6/2004 | Weichert et al. | |
| 2004/0167820 A1 | 8/2004 | Melick et al. | |
| 2004/0225514 A1 | 11/2004 | Greenshields et al. | |
| 2004/0236646 A1 | 11/2004 | Wu et al. | |
| 2004/0238630 A1 | 12/2004 | Mollett et al. | |
| 2005/0015332 A1 | 1/2005 | Chen | |
| 2005/0080634 A1 | 4/2005 | Kanniainen et al. | |
| 2005/0080658 A1* | 4/2005 | Kohn et al. | 705/8 |
| 2005/0136949 A1 | 6/2005 | Barnes, Jr. | |
| 2005/0144125 A1 | 6/2005 | Erbey et al. | |
| 2005/0274797 A1 | 12/2005 | Mollett et al. | |
| 2006/0155627 A1 | 7/2006 | Horowitz | |
| 2008/0281816 A1* | 11/2008 | Kim | 707/6 |

OTHER PUBLICATIONS

Man, Robert "Regulating Internet Payment Intermediaries" Feb. 2004, Texas Law Review v82n3 pp. 681-716.*

Olson, Jonathan E., "Affidavit of Jonathan E. Olson," dated Feb. 24, 2006, pp. 1-4.

U.S. Appl. No. 11/364,501, Jung et al.

Albers, Manuel et al.; "Contactless Payment and the Retail Point of Sale: Applications, Technologies and Transaction Models"; In Smart Card Alliance White Paper; dated Mar. 1, 2003; 50 pages; located at: http://www.atmel.fi/ad/SMARTALLIANCE/documents/Contactless_Pmt_WP%20Mar03.pdf, [No longer available—Not Attached].

PCT International Search Report; International Application No. PCT/US 07/05015; pp. 1-2; dated Sep. 26, 2007.

Biggs, Maggie; "New paradigm for b-to-b—Bill presentment and payment based on Web standards cuts costs, improves flexibility compared with traditional methods."; InfoWorld; Oct. 22, 2001; pp. 1-3.

Mann, Ronald J.; "Regulating Internet Payment Intermediaries"; Texas Law Review; Feb. 2004; pp. 681-716; v82n3.

* cited by examiner

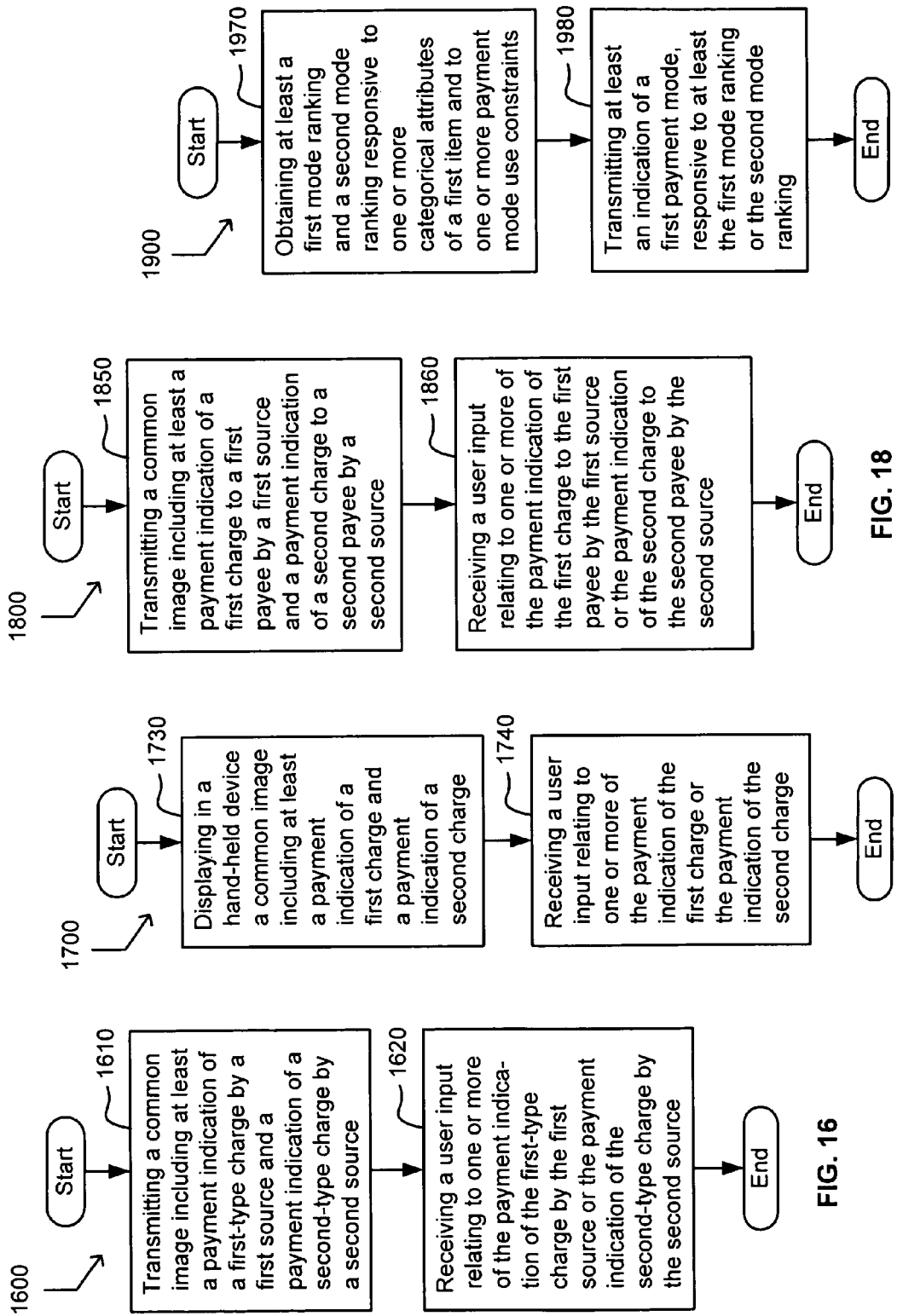

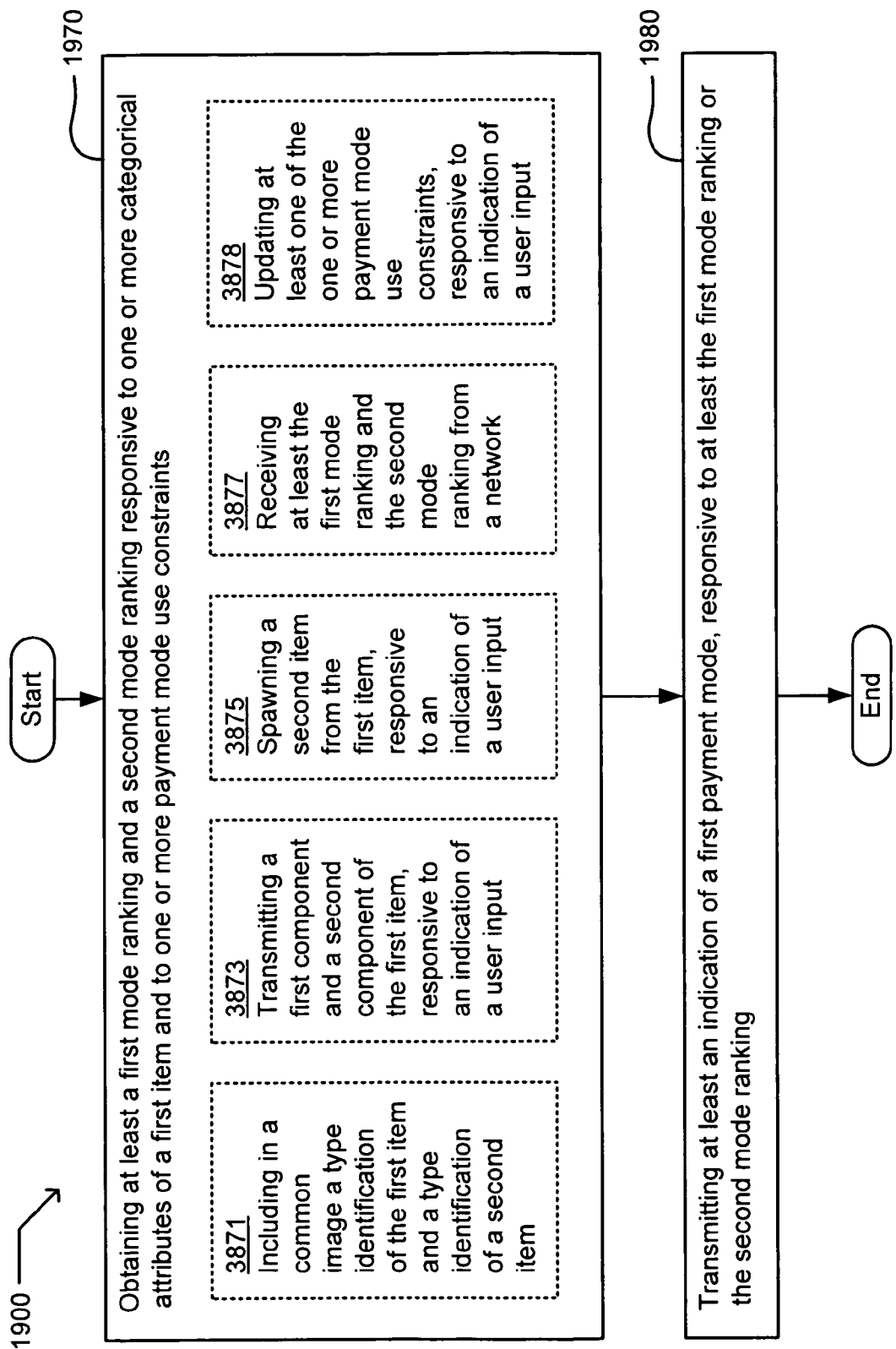

USING PAYMENT MODE RANKINGS RESPONSIVE TO ITEM ATTRIBUTES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/364,501 filed Feb. 28, 2006, entitled USING PAYMENT INDICATORS IN A COMMON IMAGE, naming Edward K. Y. Jung; Royce A. Levien; Robert W. Lord; Mark A. Malamud; John D. Rinaldo, Jr. and Lowell L. Wood, Jr. as inventors, filed contemporaneously herewith, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a method. In one implementation, the method includes but is not limited to transmitting a common image including at least a payment indication of a first-type charge by a first source and a payment indication of a second-type charge by a second source and receiving a user input relating to one or more of the payment indication of the first-type charge by the first source or the payment indication of the second-type charge by the second source. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for transmitting a common image including at least a payment indication of a first-type charge by a first source and a payment indication of a second-type charge by a second source and receiving a user input relating to one or more of the payment indication of the first-type charge by the first source or the payment indication of the second-type charge by the second source. In addition to the foregoing, other system aspects are described in the claims, drawings, and text forming a part of the present disclosure.

An embodiment provides a method. In one implementation, the method includes but is not limited to displaying in a hand-held device a common image including at least a payment indication of a first charge and a payment indication of a second charge and receiving a user input relating to one or more of the payment indication of the first charge or the payment indication of the second charge. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for displaying in a hand-held device a common image including at least a payment indication of a first charge and a payment indication of a second charge and receiving a user input relating to one or more of the payment indication of the first charge or the payment indication of the second charge. In addition to the foregoing, other system aspects are described in the claims, drawings, and text forming a part of the present disclosure.

An embodiment provides a method. In one implementation, the method includes but is not limited to transmitting a common image including at least a payment indication of a first charge to a first payee by a first source and a payment indication of a second charge to a second payee by a second source and receiving a user input relating to one or more of the payment indication of the first charge to the first payee by the first source or the payment indication of the second charge to the second payee by the second source. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for transmitting a common image including at least a payment indication of a first charge to a first payee by a first source and a payment indication of a second charge to a second payee by a second source and receiving a user input relating to one or more of the payment indication of the first charge to the first payee by the first source or the payment indication of the second charge to the second payee by the second source. In addition to the foregoing, other system aspects are described in the claims, drawings, and text forming a part of the present disclosure.

An embodiment provides a method. In one implementation, the method includes but is not limited to obtaining at least a first mode ranking and a second mode ranking responsive to one or more categorical attributes of a first item and to one or more payment mode use constraints and transmitting at least an indication of a first payment mode responsive to at least the first mode ranking or the second mode ranking. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for obtaining at least a first mode ranking and a second mode ranking responsive to one or more categorical attributes of a first item and to one or more payment mode use constraints and transmitting at least an indication of a first payment mode responsive to at least the first mode ranking or the second mode ranking. In addition to the foregoing, other system aspects are described in the claims, drawings, and text forming a part of the present disclosure.

In addition to the foregoing, various other embodiments are set forth and described in the text (e.g., claims and/or detailed description) and/or drawings of the present description.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 16 depicts a high-level logic flow of an operational process.

FIG. 17 depicts a high-level logic flow of another operational process.

FIG. 18 depicts a high-level logic flow of another operational process.

FIG. 19 depicts a high-level logic flow of another operational process.

FIGS. 32-38 each depict several variants of the flow of FIG. 19.

DETAILED DESCRIPTION

Figure 1:
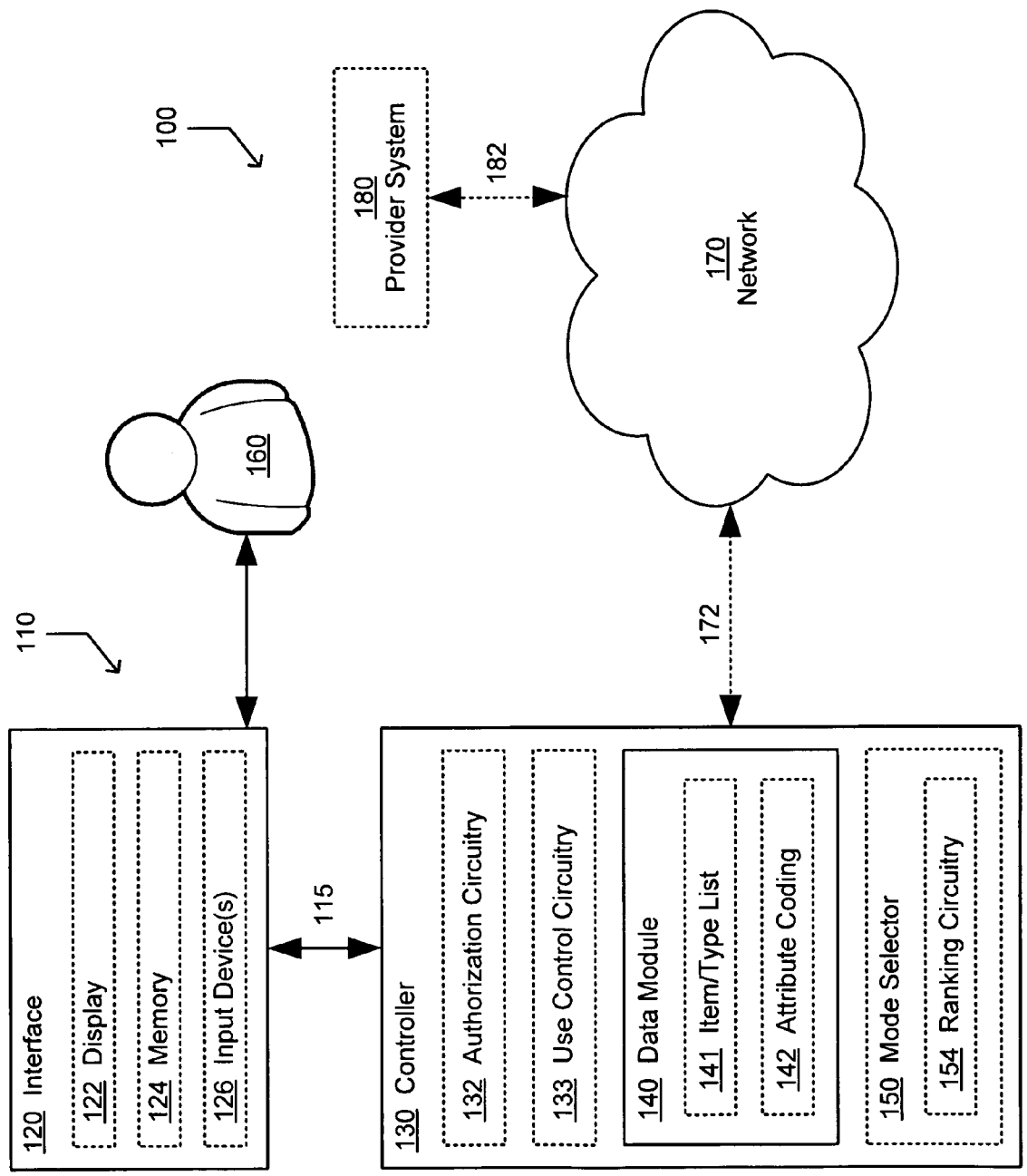
FIG. 1 depicts an exemplary environment in which one or more technologies may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring now to FIG. 1, there is shown an exemplary environment in which one or more technologies may be implemented. User 160 can interact with modular system 110 of network subsystem 100. Network subsystem 100 includes modular system 110, and can further include provider system 180, a network 170 (such as a LAN), and linkages 172, 182 to network 170 as shown. Provider system can, for example, include counterparts for some or all of the components shown for modular system 110.

Modular system 110 includes interface 120, which can include one or more of display 122, memory 124, or input device(s) 126. Modular system 110 further includes controller 130 linked to interface 120 by medium 115. Controller 130 includes data module 140, and can include one or more of authorization circuitry 132, use control circuitry 133, or mode selector 150. Data module 140 can include one or more of item/type list 141 or attribute coding 142. Mode selector 150 can include ranking circuitry 154.

Figure 2:
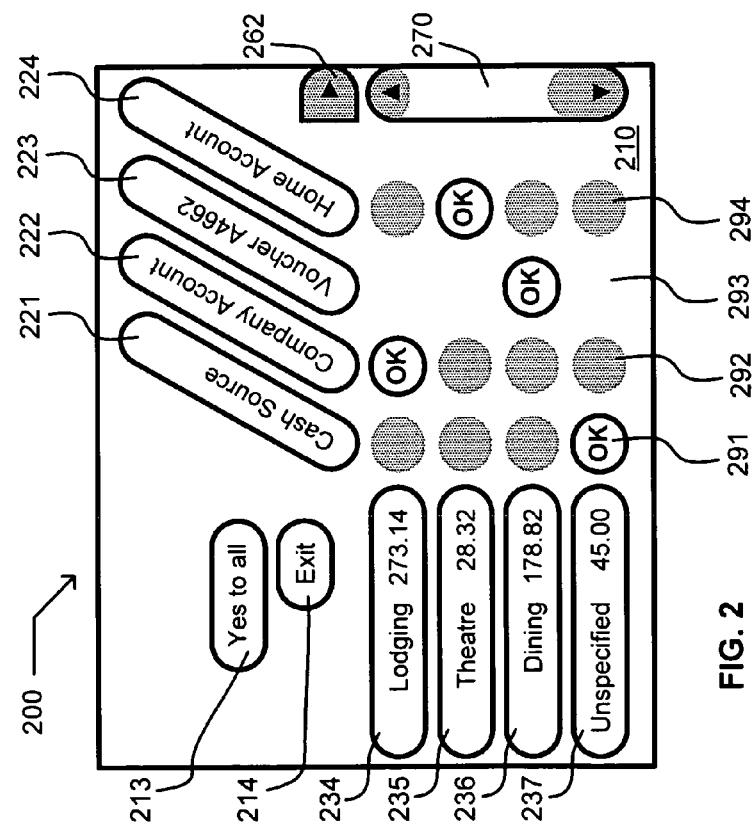
FIG. 2 depicts a window displaying a portion of an image, as an example of the user interface of FIG. 1.

FIG. 2 shows window 200 displaying a bottom left portion of image 210 enabling a user to scroll right with button 262 or up with scroll bar 270. Image 210 includes a grid including several rows each tagged by a respective button (e.g. button 234, button 235, button 236, and button 237). The grid likewise includes several columns each tagged by a respective button (e.g. button 221, button 222, button 223, and button 224). Each row/column intersection defines a respective cell containing a ranking indicator: a white space, a gray button, or a circled "OK" label (in ascending order). In some embodiments, other indications of differential payment mode ranking can be used, such as one or more colors, screen positions, patterns, numbers, symbols, or combinations of these.

In some implementations of FIG. 2, button 291, button 292, and button 294 each occupy a respective cell and serve a respective function. In some embodiments a grid contains one or more ranking-indicative cells each containing a user-operable control (button 291, e.g.) and one or more ranking indicative cells (cell 293, e.g.) each not containing a user-operable control. Button 291 initiates a payment according to a mode corresponding to its column (via the "Cash Source," in this example) for a charge of $45 identified as "Unspecified." Optionally, button 291 can directly or immediately authorize such a payment or can cause one or more additional images to appear (such as a confirmation window) enabling a user to authorize such a payment. Alternatively or additionally, activation of button 291 can enable or trigger a display including one or more of additional information about the charge identified as "Unspecified," such as the date(s) of the charge, a description of one or more items in the charge, an address or other information about one or more payees connected with the item, and the like.

Activation of a control signifying a mode having a less-than-highest ranking for its corresponding charge can have different effects in different embodiments. Interface 120 can be configured so that activating button 292 causes a corresponding payment mode ("Company Account," e.g.) to receive a circled "OK" label for a corresponding charge ("Unspecified," e.g.), optionally changing the rankings of other modes as well (making button 291 gray, e.g.). Alternatively, interface 120 can be configured so that activating button 292 causes a modal control object to appear, providing a user one or more options for influencing rankings, inclusions, payments, or other features.

In the instance of FIG. 2 as shown, the four "OK" buttons visible in FIG. 2 each signify heterogeneous payments, each from a different source and for a different item than any of the others. User 160 can signal an authorization of all of them by actuating button 213, in some implementations, or can exit the interface to some other utility by actuating button 214. Of course it will be understood that the particular layout, look, feel, and operation of the interface of FIG. 2 are not essential for using the teachings herein, but it is sometimes helpful to see a feature illustrated, for ready understanding. Toward that end several exemplary images follow.

Figure 3:
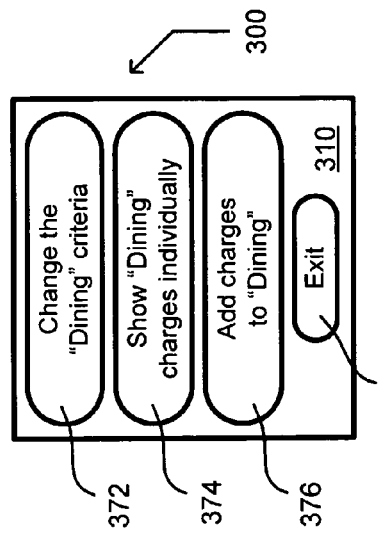
FIG. 3 depicts a modal control object.

FIG. 3 shows an example of a modal control object, window 300, suitable for transmitting to display 122 responsive to receiving a user input event of button 236 being actuated. Window 300 includes an image 310 containing button 372, button 374, button 376, and button 378.

Figure 4:
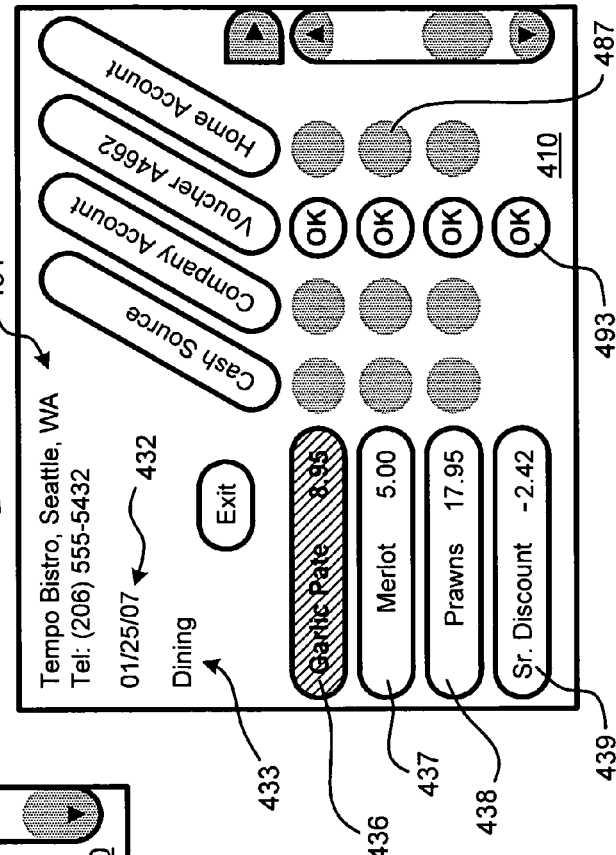
FIG. 4 depicts the window updated to display another image.

FIG. 4 shows window 200 of FIG. 2 updated to display a portion of image 410 indicating a breakdown of items in the "Dining" charge of $178.82 indicated by button 236. In some implementations, such a breakdown is accessible via a modal or other control object. Window 200 can be configured to enable user 160 to access image 410 in some implementations by activating button 236, for example, or by activating button 374. Image 410 includes provider label 431, date label 432, or item type label 433, one or more of which can be implemented as display-only label showing a selection-dependent value. Button 436 is shown in a selected state (as image 410 indicates by a pattern, a color, a symbol, or the like) that controls the contents of label 431, label 432, and label 433. In some implementations, user 160 can de-select button 436 by actuating button 437 or button 438.

Button 493 is the only item on same row as button 439, indicating that the senior discount can be applied against the voucher source/mode but not against the others shown. Others of the items (such as the "Merlot" item) can be assigned to other columns, such as in response to detecting an actuation of button 487, described below relative to FIG. 22.

Figure 5:
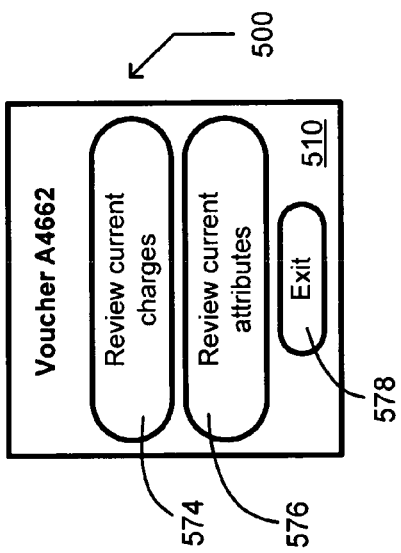
FIG. 5 depicts another modal control object.

FIG. 5 shows another example of a modal control object, window 500, suitable for showing responsive to button 223 of FIG. 2. Window 500 includes an image 510 containing button 574, button 576, and button 578.

Figure 6:
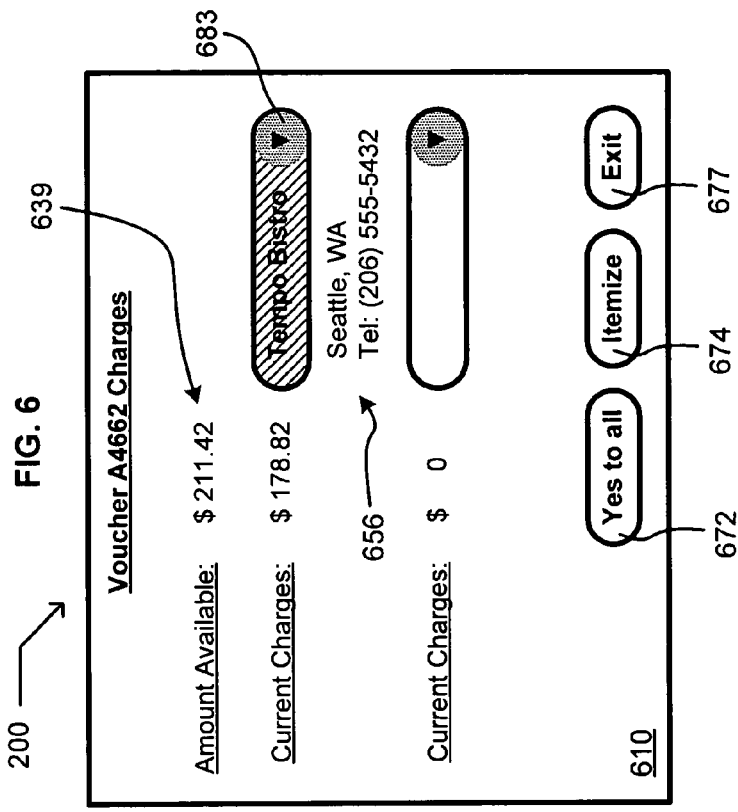
FIG. 6 depicts the window updated to display another image.

FIG. 6 shows window 200 of FIG. 2 updated to display image 610, suitable for showing responsive to button 574 or button 223. Image 610 includes a quantitative attribute 639 of the "Voucher A4662" source, and a summary of current charges relating to attribute 639. In the example shown, all of the current charges relate to a payee of "Tempo Bistro," a currently selected item of selection tool 683, a selectable pop-up menu. Display-only label 656 provides additional information about the selection. Button 672 can be actuated to authorize the "Voucher A4662" charges shown. Button 674 can be actuated to show the "Tempo Bistro" charges. Button 677 can be used to return to another menu.

Figure 7:
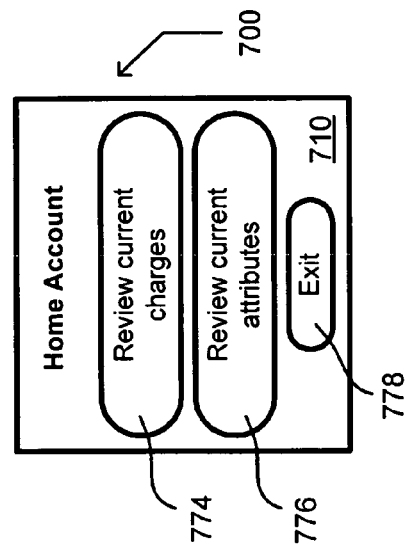
FIG. 7 depicts another modal control object.

FIG. 7 shows another example of a modal control object, window 700, suitable for showing responsive to button 224 of FIG. 2. Window 700 includes an image 710 containing button 774, button 776, and button 778.

Figures 8, 9:
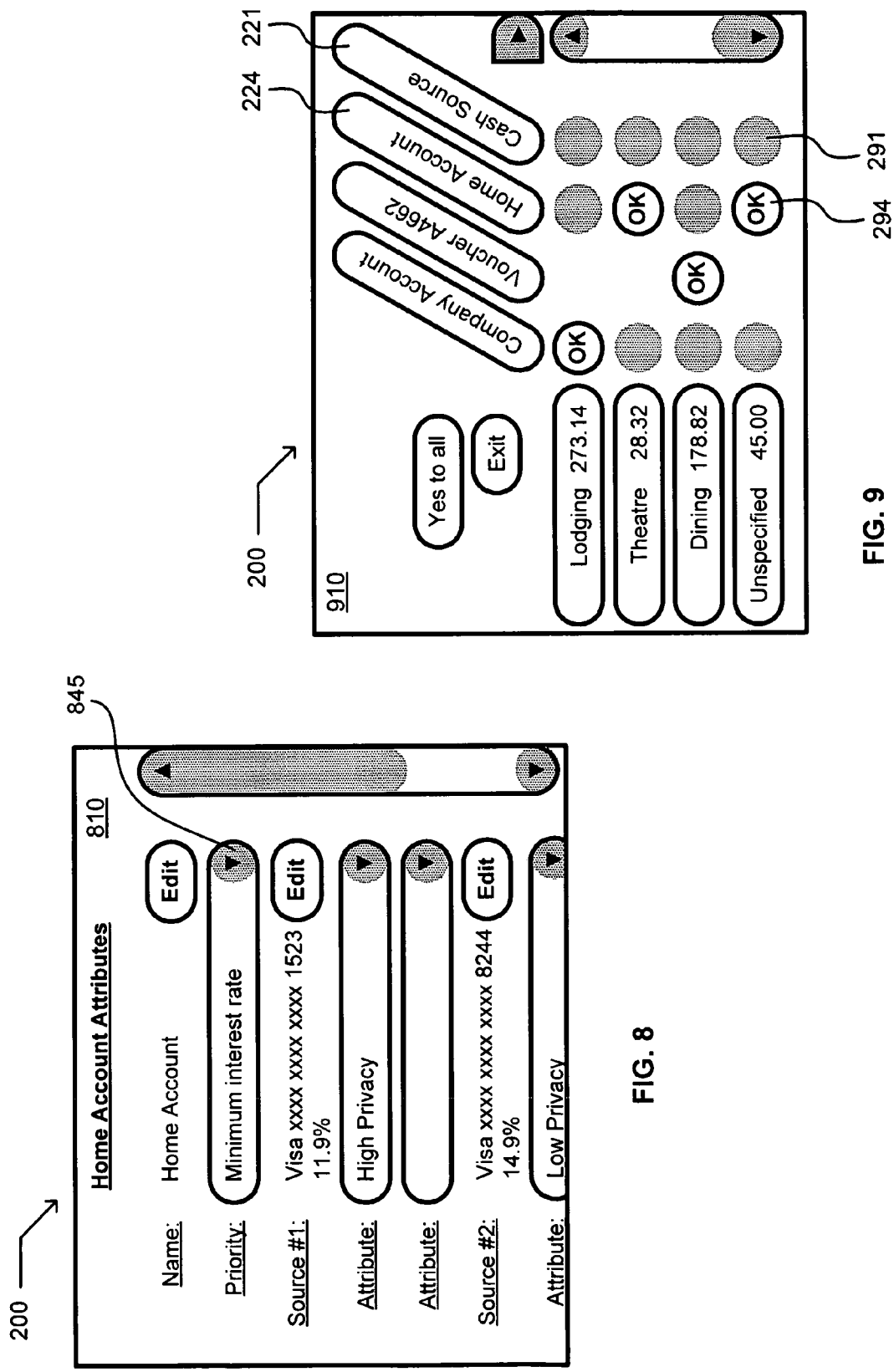
FIG. 8 depicts the window updated to display another image.
FIG. 9 depicts the window updated to display another image.

FIG. 8 shows window 200 of FIG. 2 updated to display image 810, suitable for showing responsive to button 774 or button 224. Image 810 includes a hierarchy of sources of the "Home Account" source, including account identifiers, interest rates, privacy settings, and preferential rankings. Also ranking schema selector 845 is set to "Minimum Interest Rate," so that an available source having the lowest available interest rate will automatically be assigned to the most-preferred source slot (as "Source #1"). In some embodiments, at least first and second sources (such as those visible in image 210, for example) has an independently assignable ranking schema.

FIG. 9 shows window 200 of FIG. 2 updated to display image 910, in which a priority between sources has been changed by (dragging and) dropping button 221 to the right-most visible column, just to the right of button 224. (This shifted the entire column, including moving button 291 from its former position to the right off button 294.) In some embodiments, such a display-manipulative input can alter the respective priorities of the relatively-moved sources, as described below in relation to FIG. 24. In image 910, for example, the "Unspecified" $45.00 charge was reassigned from "Cash Source" to "Home Account" as a direct result of the (drag and drop) priority change (from image 210), without modular system 110 receiving any indication that button 294 was actuated.

Figure 10:
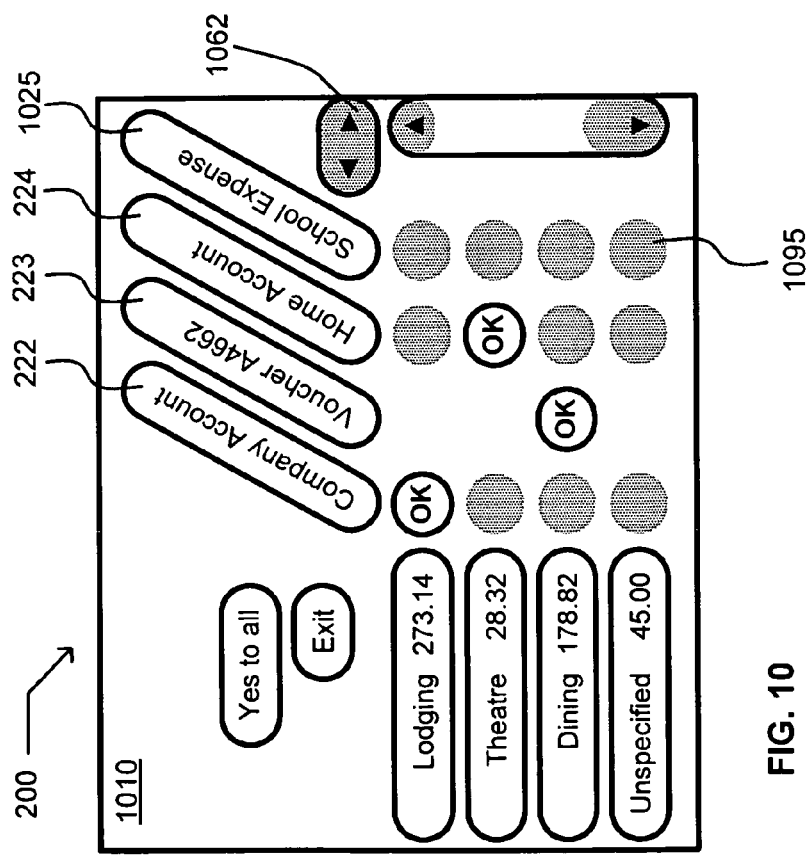
FIG. 10 depicts the window updated to display another image.

FIG. 10 shows window 200 displaying screen image 1010 of image 210, slightly offset from the portion of image 210 that is visible in FIG. 2. Screen image 1010 shows most of the same buttons as FIG. 2, including button 222, button 223, and button 224. Button 1025 and button 1095 have been added, for reasons described below at FIG. 23. Button 262 has also been replaced by bidirectional control 1062 as shown in FIG. 10, also due to the offset.

Figure 11:
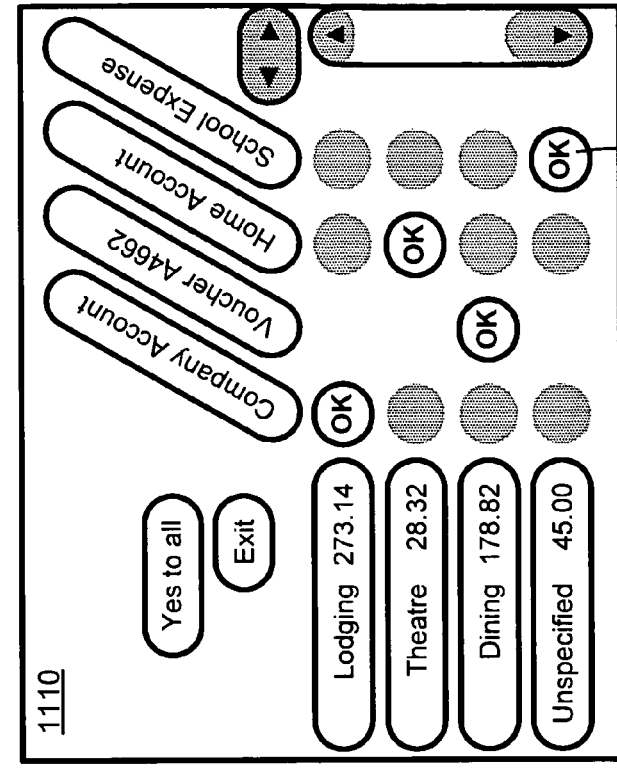
FIG. 11 depicts the window updated to display another image.

FIG. 11 shows window 200 updated to display image 1110, which is the same as screen image 1010 except that the $45.00 charge has been associated with the "School Expense" source responsive to an indication that button 1095 was actuated.

Figures 12, 13:
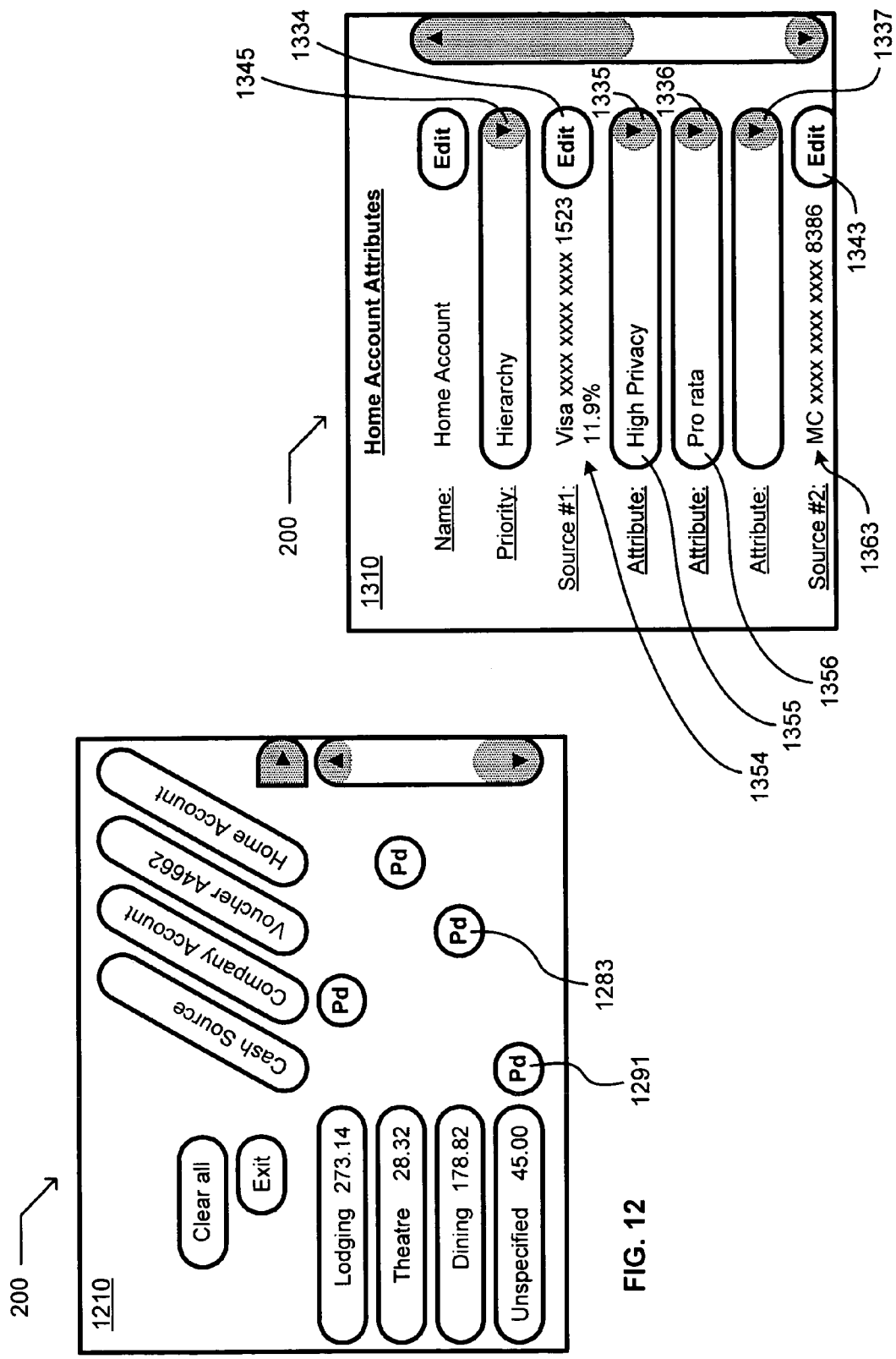
FIG. 12 depicts the window updated to display another image.
FIG. 13 depicts the window updated to display another image.

FIG. 12 shows window 200 updated to display image 1210, which as shown is similar to image 210 except in two respects. First, all of the solid gray buttons of image 210 have been removed. Second, each of the payment options presented as "OK" buttons in image 210 have been changed to show "Pd" to signify that they have been paid, or at least authorized for payment. State changes like this (from image 210 to image 1210, e.g.) can be accomplished by a succession of authorizations (such as by actuating each "OK" button, e.g.) or by a single actuation (of button 213, e.g.). In some implementations, a common image indicates a heterogeneous combination of past expenditures, such as by including both button 1291 and button 1283 in the same image.

FIG. 13 shows window 200 of FIG. 2 updated to display image 1310, suitable for showing responsive to button 774 or button 224. Like image 810 of FIG. 8, image 1310 includes a hierarchy of (component) sources of a "Home Account" source, including account identifiers and other attributes of each component source. Also ranking schema selector 1345 is set to "Hierarchy," defining an allocation such that each available component source is applied against a charge up to its respective limit, such as can be imposed by an available balance or pro rata allocation. Source #1, for example, is identified by a label 1354 identifying the component source and its interest rate, editable by button 1334. Source #1 also has a "High Privacy" attribute 1355 (editable by control 1335) and a "Pro rata" attribute 1356 (editable by control 1336). Also window 200 is configured so that further attributes can be given to Source#1 via control 1337. Source #2 is similarly identified by a label 1363 identifying the component source, and optionally by its interest rate or other attributes editable by button 1343.

Figure 14:
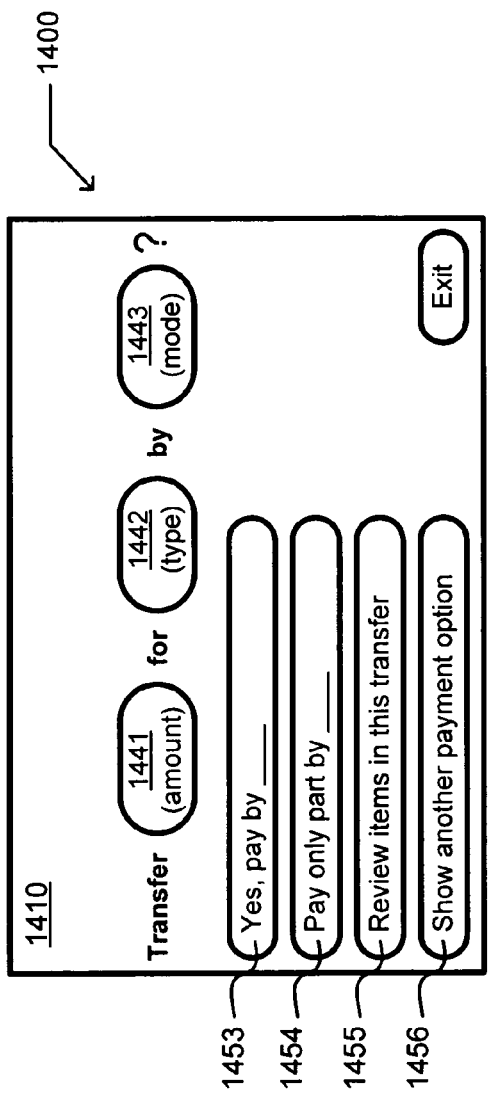
FIG. 14 depicts another window as an example of the user interface of FIG. 1.

FIG. 14 shows window 1400 suitable for enabling a user to authorize or review heterogeneous and similar programmatic payments in systems like those of FIG. 1. An upper portion of image 1410 includes a payment indication, in this case a payment option proposing to use parameters each displayed on a respective one of button 1441, button 1442, and button 1443. Interface 120 can be configured so that, for example, an indication of an actuation of any of these buttons causes display 122 to show additional information relating to that payment or item parameter. Interface 120 receiving an indication of an actuation of button 1453 can likewise cause display 122 to show a confirmation or detail screen, or can cause authorization circuitry 132 to authorize the payment(s) indicated by the label of button 1453. Alternatively or additionally, interface 120 can respond to an actuation of button 1454 by offering user 160 a variety of ways to authorize a portion of the payment, such as a fixed amount, a percentage, an equal share among a number of partners, or the like. Alternatively or additionally, interface 120 can respond to an actuation of button 1455 by offering user 160 a list of the items or an opportunity to approve or reject them selectively. Alternatively or additionally, interface 120 can respond to an actuation of button 1456 by offering user 160 a next-best-ranked mode of payment as indicated by mode selector 154.

Figure 15:
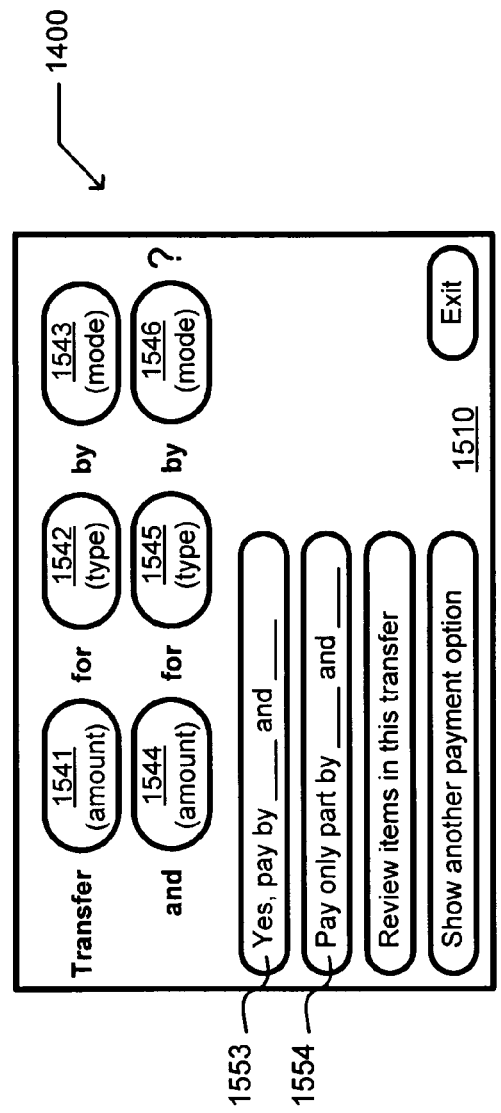
FIG. 15 depicts the other window updated to display another image.

FIG. 15 shows a variant of window 1400 in which heterogeneous payments can be authorized explicitly, for example, by identifying different modes in their respective mode-indicative buttons 1543, 1546. The respective amount-indicative buttons 1541, 1544 and the type-indicative buttons 1542, 1545 can likewise be shown in a common image 1510. Like button 1553 or button 1554 can be configured to trigger a heterogeneous payment authorization or partial payment authorization, respectively.

Referring now to FIG. 16, there is shown a high-level logic flow 1600 of an operational process. Operation 1610 shows transmitting a common image including at least a payment indication of a first-type charge by a first source and a payment indication of a second-type charge by a second source (e.g. interface 120 transmitting image 210 of FIG. 2 or image 1510 of FIG. 15). The common image can comprise one or more graphic files displayed simultaneously or otherwise combined, in some embodiments, and can include one or more sources owned by different entities.

Operation 1620 shows receiving a user input relating to one or more of the payment indication of the first-type charge by the first source or the payment indication of the second-type charge by the second source (e.g. controller 130 receiving an indication that a user selected a gift certificate for a book or a debit card for a movie). In some embodiments, the user input comprises a pulse, a code, or another indication of a key press, an interrupt, a mouse click or release, a time-out, a message or a component thereof, a button or pointer actuation, a scrollbar event, a power-on, or similar indication relating to ordinary user interactions.

Referring now to FIG. 17, there is shown a high-level logic flow 1700 of an operational process. Operation 1730 shows displaying in a hand-held device a common image including at least a payment indication of a first charge and a payment indication of a second charge (e.g. interface 120 displaying image 210 of FIG. 2 or image 1510 of FIG. 15). The common image can comprise one or more files displayed substantially simultaneously, in some embodiments, and can include one or more sources owned by different entities.

Operation 1740 shows receiving a user input relating to one or more of the payment indication of the first charge or the payment indication of the second charge (e.g. controller 130 receiving an indication that a user selected a gift certificate for a book or a debit card for a movie). The selections can be based on mode rankings identifying an intelligent default selection of a source, in some embodiments, for one or more of the payments.

Referring now to FIG. 18, there is shown a high-level logic flow 1800 of an operational process. Operation 1850 shows transmitting a common image including at least a payment indication of a first charge to a first payee by a first source and a payment indication of a second charge to a second payee by a second source (e.g. interface 120 displaying image 210 of FIG. 2 or image 1510 of FIG. 15). The common image can comprise one or more files displayed substantially simultaneously, in some embodiments, and can include one or more sources owned by different entities.

Operation 1860 shows receiving a user input relating to one or more of the payment indication of the first charge to the first payee by the first source or the payment indication of the second charge to the second payee by the second source (e.g. controller 130 receiving an indication that a user selected a gift certificate for a book or a debit card for a movie). The selections can be based on mode rankings identifying an intelligent default selection of a source, in some embodiments, for one or more of the payments.

Referring now to FIG. 19, there is shown a high-level logic flow 1900 of an operational process. Operation 1970 shows obtaining at least a first mode ranking and a second mode ranking responsive to one or more categorical attributes of a first item and to one or more payment mode use constraints (e.g. controller 130 automatically determining that a company card is better than a debit card or cash, for business trip expenses in light of company policy). In some embodiments, one or more instructions implement the company's per diem rules as to the company card rankings.

Operation 1980 shows transmitting at least an indication of a first payment mode responsive to at least the first mode ranking or the second mode ranking (e.g. interface 120 transmitting image 210 of FIG. 2 or image 1510 of FIG. 15). In some embodiments, transmitting operation 1980 coincides with operation 1610, operation 1730, or operation 1850, or one of their variants as described below, optionally as an implementation of the corresponding flow 1600, 1700, or 1800.

Of course it will be understood by those skilled in the art that variations of the network subsystem 100 can perform other combinations of flows 1600 through 1900. Modular system 110 can include multiple instances of shown components, for example, or components configured to combine functions as taught herein. Provider system 180 may include an anatomy like that shown for modular system 110, in some implementations of network subsystem 100.

Figure 20:
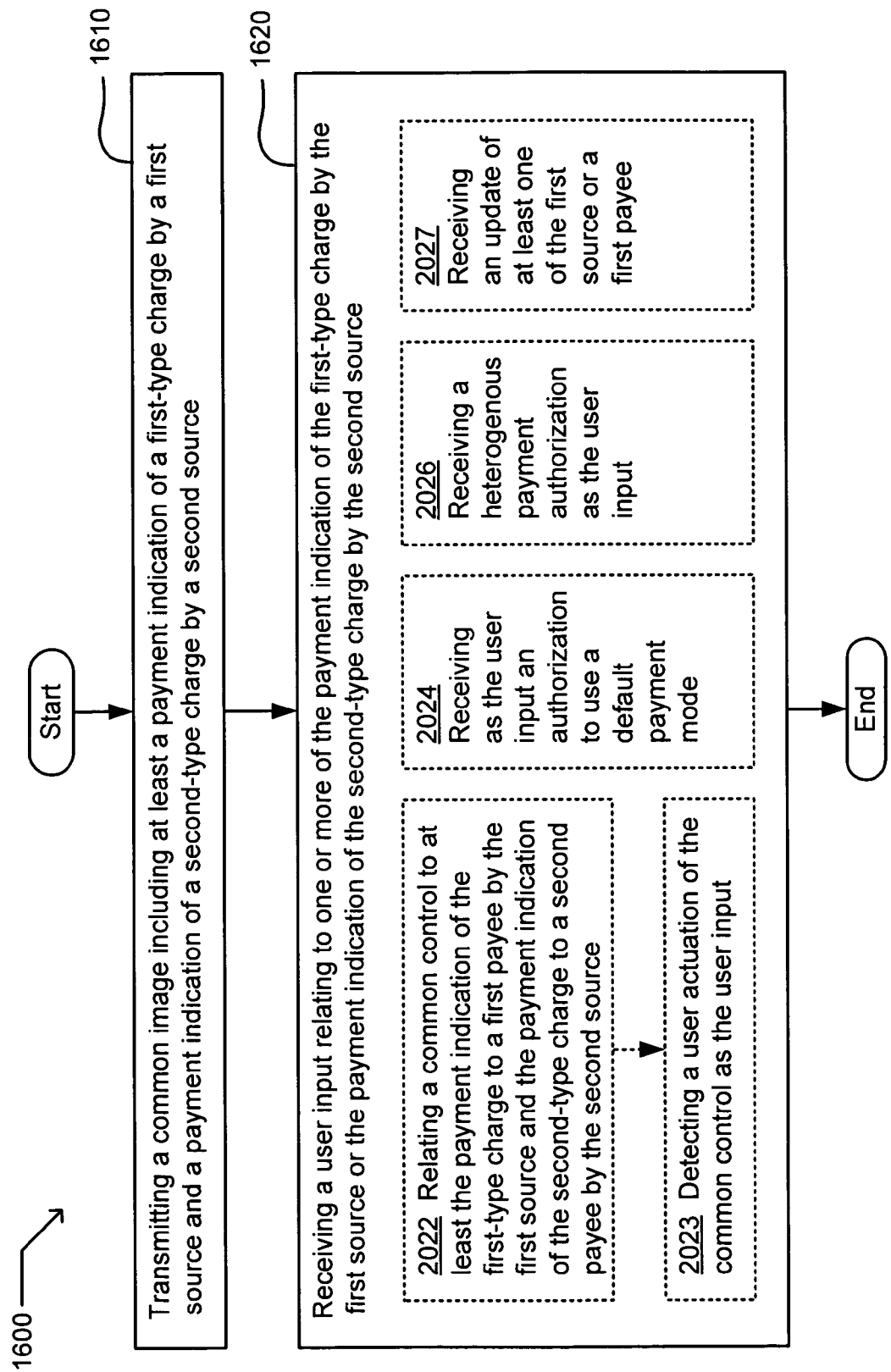
FIGS. 20-26 each depict several variants of the flow of FIG. 16.

Referring now to FIG. 20, there are shown several variants of the flow 1600 of FIG. 16. Operation 1620—receiving a user input relating to one or more of the payment indication of the first-type charge by the first source or the payment indication of the second-type charge by the second source—may include one or more of the following operations: 2022, 2023, 2024, 2026, or 2027. Operation 2022 describes relating a common control to at least the payment indication of the first-type charge to a first payee by the first source and the payment indication of the second-type charge to a second payee by the second source (e.g. memory 124 of FIG. 1 containing records with amounts, types and modes as shown in FIG. 15). This can occur, for example, in an implementation in which controller 130 performs operation 1610 and in which interface 120 performs operation 1620. Button 1541 can show a first charge of $91.23, for example, and button 1543 can show a mode of "AmEx."

Operation 2023 describes detecting a user actuation of the common control as the user input (e.g. input device(s) 126 detecting an actuation of button 1553), optionally used in combination with operation 2022 as described above.

Operation 2024 describes receiving as the user input an authorization to use a default payment mode (e.g. authorization circuitry 132 receiving a user-preference ranking schema component that all charges eligible for "Voucher A4662" be authorized for payment via that voucher upon receipt). This can occur, for example, in an implementation in which interface 120 performs operation 1610 and in which controller 130 performs operation 1620. Alternatively or additionally, one or more payment sources trigger a query to the user asking for a confirmation specific to one or more default payment modes.

Operation 2026 describes receiving a heterogeneous payment authorization as the user input (e.g. authorization circuitry 132 receiving an indication of an actuation of button 1553). In some embodiments, authorization circuitry 132 responds by transmitting authorizations for payments from different sources for different charge types.

Operation 2027 describes receiving an update of at least one of the first source or a first payee (e.g. data module 140 updating item/type list with a payee address). This can occur, for example, in an implementation in which interface 120 performs operation 1610 and in which controller 130 performs operation 1620.

Figure 21:
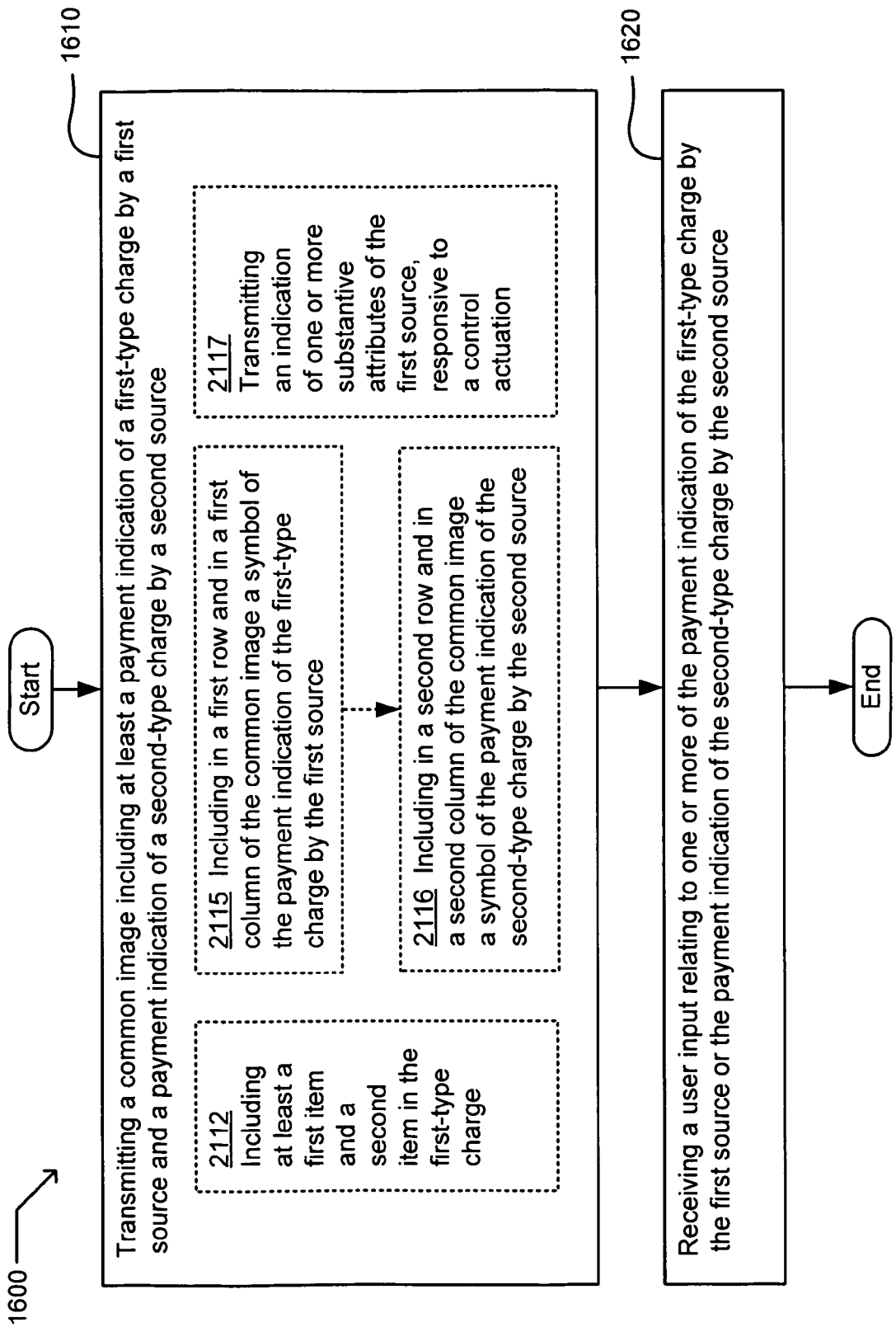

Referring now to FIG. 21, there are shown several variants of the flow 1600 of FIG. 16 or 20. Operation 1610—transmitting a common image including at least a payment indication of a first-type charge by a first source and a payment indication of a second-type charge by a second source may include one or more of the following operations: 2112, 2115, 2116, or 2117. Operation 2112 describes including at least a first item and a second item in the first-type charge (e.g. item/type list 141 receiving a list of several charges user 160 generates in a retail store). This can occur, for example, in an implementation in which interface 120 performs operation 1610 and in which controller 130 performs operation 1620. It can also occur in embodiments in which operation 1620 is performed by a combination of controller 130 and other circuitry, such as interface 120 or linkage 172.

Operation 2115 describes including in a first row and in a first column of the common image a symbol of the payment indication of the first-type charge by the first source (e.g. display 122 showing a "Pd" symbol on button 1283). This can occur, for example, in an implementation in which controller 130 performs operation 1610 and in which interface 120 performs operation 1620.

Operation 2116 describes including in a second row and in a second column of the common image a symbol of the payment indication of the second-type charge by the second source (e.g. memory 124 causing display 122 to show a "Pd" symbol on button 1291). Operation 2116 can optionally be used with operation 2115 as shown (albeit not necessarily in the depicted order, as will be readily apparent to those skilled in the art).

Operation 2117 describes transmitting an indication of one or more substantive attributes of the first source, responsive to a control actuation (e.g. attribute coding 142 transmitting an interest rate, a privacy attribute, or a formula attribute as shown in FIG. 13, responsive to an actuation of button 1224 of FIG. 12). This can occur, for example, in an implementation in which interface 120 performs operation 1610. In some embodiments, operation 2117 includes receiving one or more source attributes as user input (e.g. receiving an indication that user 160 has used pop-up menu control 1336 to select a pro rata or other systematic sharing attribute for a common source).

Figure 22:
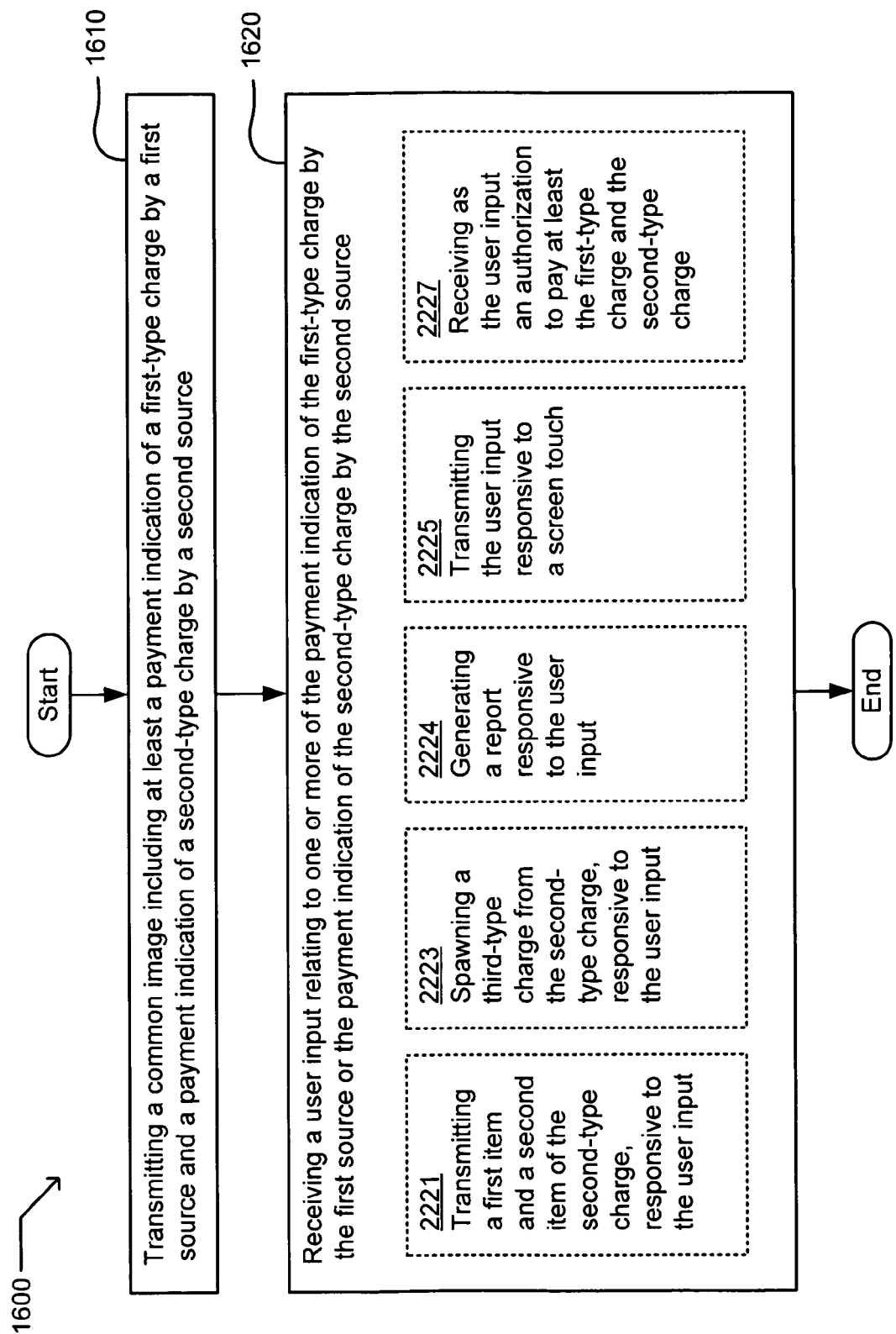

Referring now to FIG. 22, there are shown several variants of the flow 1600 of FIG. 16, 20, or 21. Operation 1620—may include one or more of the following operations: 2221, 2223, 2224, 2225, or 2227. Operation 2221 describes transmitting a first item and a second item of the second-type charge responsive to the user input (e.g. data module 140 transmitting itemized charges from item/type list 141 responsive to receiving a code indicating that button 374 was activated). The dining-type charge includes items of "Garlic pate," "Prawns," and "Sr. Discount" or the amounts thereof for example, in the illustration of FIG. 4.

Operation 2223 describes spawning a third-type charge from the second-type charge, responsive to the user input (e.g. data module 140 responding to an indication of an activation of button 487 by moving the $5.00 charge from the dining-type charge into another type of charge). This can occur, for example, in an implementation in which interface 120 performs operation 1610 and in which controller 130 performs operation 1620. Optionally a default name ("Liquor" or "Dining2", e.g.) can be assigned as a type label of the spawned charge by data module 140. In some embodiments, a data module prompts a confirmation or new name responsive to the spawning or otherwise allows user 160 to revise the name (via interface 120, e.g.). In some embodiments, the second-type charge is likewise spawned from a component of the first-type charge before the receiving operation 1620 begins.

Operation 2224 describes generating a report responsive to the user input (e.g. authorization circuitry 132 recording all of the authorized charges and generating an expense report for one or more company-owned sources). In some embodiments, authorization circuitry automatically transmits a request for reimbursement, responsive to one or more such charges. These variants can occur, for example, in an implementation in which controller 130 performs operation 1620.

Operation 2225 describes transmitting the user input responsive to a screen touch (e.g. display 122 detecting the screen touch, such as by a digit or stylus). This can occur, for example, in an implementation in which interface 120 performs operation 1620. In some embodiments, the screen touch is detected (by provider system 180, for example) by receiving a signal from display 122.

Operation 2227 describes receiving as the user input an authorization to pay at least the first-type charge and the second-type charge (e.g. input device(s) 126 receiving an indication of an actuation of button 1553 or an actuation of button 213). Operation 2227 can optionally be performed some time after a user initiates the user input in some embodiments, for example, such as by an embodiment of provider system 180 in which flow 1600 is performed in a location that is physically remote from any user.

Figure 23:
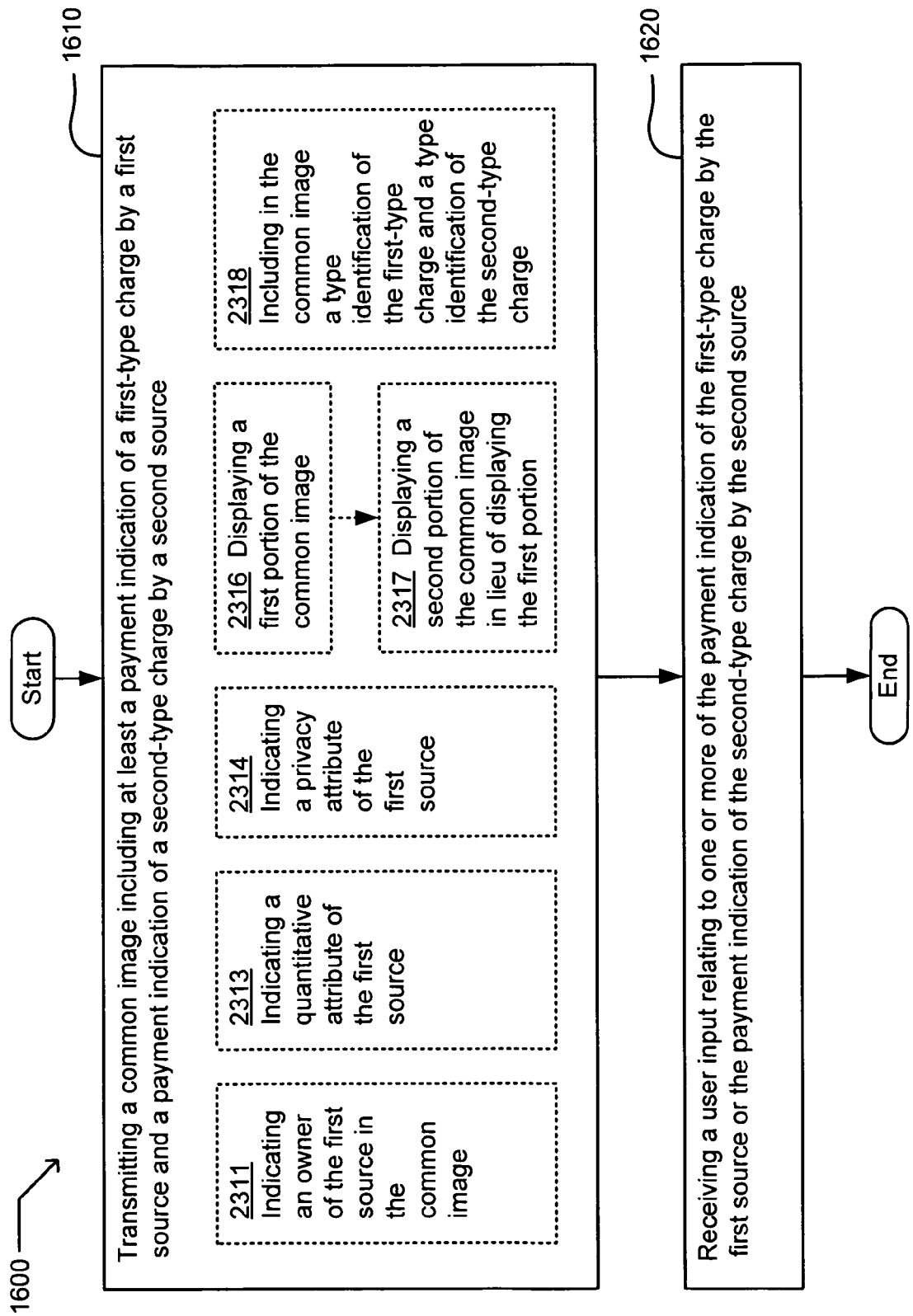

Referring now to FIG. 23, there are shown several variants of the flow 1600 of FIG. 16, 20, 21, or 22. Operation 1610—transmitting a common image including at least a payment indication of a first-type charge by a first source and a payment indication of a second-type charge by a second source—may include one or more of the following operations: 2311, 2313, 2314, 2316, 2317, or 2318. Operation 2311 describes indicating an owner of the first source in the common image (e.g. data module 140 generating, retrieving, receiving, or otherwise obtaining image 210, which indicates "Company" in a label of button 222). This can occur, for example, in an implementation in which interface 120 performs operation 1610 and in which controller 130 performs operation 1620. In some such embodiments, operation 2311 includes receiving a name attribute (e.g. "BLTG MC") and other attributes of a source (a company account, e.g.) via a network linkage such as linkage 172.

Operation 2313 describes indicating a quantitative attribute of the first source (e.g. data module 140 downloading or computing capacity information as indicated in FIG. 6, indicating a balance from a source identified as "Voucher A4662"). Alternatively or additionally, the quantitative attribute can include a per diem or per-charge limit, a surcharge, a usage count, a total capacity, a balance, an interest rate, a penalty, a usage fee, or the like. In some embodiments, one or more of the sources can exclude any quantitative attribute.

Operation 2314 describes indicating a privacy attribute of the first source (e.g. data module 140 generating, retrieving, receiving, or otherwise obtaining source #1 information indicated in FIG. 13, including privacy attribute 1355). In some embodiments, a higher privacy protocol can cause a transaction to be shown less explicitly on a bill, to be grouped in a "private" type or charge, to be shown on a separate bill, or to require a password for access via display 122.

Operation 2316 describes displaying a first portion of the common image (e.g. display 122 showing image 210 to include button 221 and its column, as shown in FIG. 2). This can occur, for example, in an implementation in which controller 130 performs operation 1610 and in which interface 120 performs operation 1620.

Operation 2317 describes displaying a second portion of the common image in lieu of displaying the first portion (e.g. memory 124 and display 122 displaying screen image 1010 of image 210 to include button 1025 in lieu of button 221, as shown in FIG. 10). Operation 2317 can optionally be used with operation 2316, as shown, responsive to one or more controls (e.g. button 262 or scroll bar 270 of FIG. 2).

Operation 2318 describes including in the common image a type identification of the first-type charge and a type identification of the second-type charge (e.g. data module 140 receiving, storing, retrieving, or transmitting image 210, which includes payment indications of a theatre-type charge by a home account and of a dining-type charge by a voucher).

Figure 24:
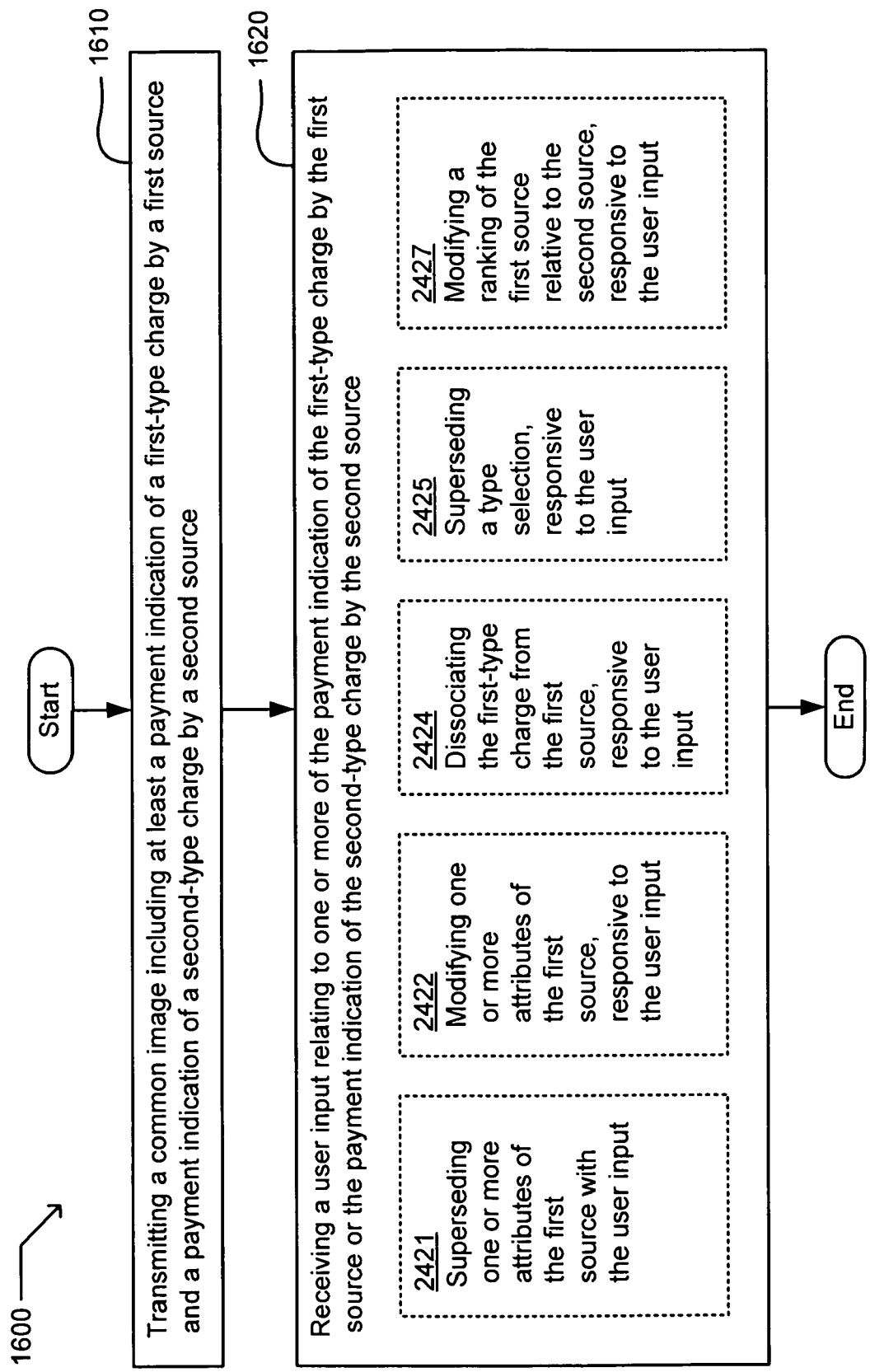

Referring now to FIG. 24, there are shown several variants of the flow 1600 of FIG. 16, 20, 21, 22, or 23. Operation 1620—receiving a user input relating to one or more of the payment indication of the first-type charge by the first source or the payment indication of the second-type charge by the second source—may include one or more of the following operations: 2421, 2422, 2424, 2425, or 2427. Operation 2421 describes superseding one or more attributes of the first source with the user input (e.g. data module 140 changing a label, an owner list, or a use restriction of a "Home Account" source responsive to a user command). In some embodiments, the user command can be received via a keyboard or speech recognition system, for example. Alternatively or additionally, this can occur in an implementation in which interface 120 performs operation 1610 and in which controller 130 performs operation 1620.

Operation 2422 describes modifying one or more attributes of the first source, responsive to the user input (e.g. use control circuitry 133 downloading one or more use restrictions of the "Voucher A4662" source via the worldwide web). In some embodiments, the user input is a password or command for such a download received via input device(s) 126 and transmitted via linkage 172, for example, to provider system 180 or some other system of network 170.

Operation 2424 describes dissociating the first-type charge from the first source, responsive to the user input (e.g. mode selector 150 responding to a reduction of the ranking of "Cash Source" by dissociating the $45.00 ("unspecified"-type) charge from "Cash Source." In the embodiment of FIG. 9, for example, such a dissociation is manifested by button 291 turning solid gray, relative to the higher-ranking appearance of button 291 in FIG. 2. Referring again to FIG. 12, there it is shown that the "Home Account" source has been dissociated from the "unspecified"-type charge responsive to a user input authorizing that charge to be paid from "Cash Source," as explained above with reference to FIG. 12.

Operation 2425 describes superseding a type selection, responsive to the user input (e.g. data module 140 responding to an indication that "Merlot" should be not be a dining-type item, in the example of FIG. 4). In some embodiments, data module 140 may transmit a categorization request (remotely via linkage 172, e.g.) including an item descriptor and await a suggested category name (e.g. "Liquor") from a server. Alternatively or additionally, data module 140 may transmit a user query responsive to such an indication, permitting a user to input or validate a new type label.

Operation 2427 describes modifying a ranking of the first source relative to the second source, responsive to the user input (e.g. display 122 transitioning from image 210 to image 910, indicating a reduction in the ranking of "Cash Source" responsive to a drag-and-drop of button 221). This can occur, for example, in an implementation in which controller 130 performs operation 1610. In some embodiments, the user input is a user profile update command, triggering ranking circuitry to download a ranking scheme from a network (network 170, e.g.). In many implementations, such a ranking modification may have no immediate effect on a display or the payment indications.

Figure 25:
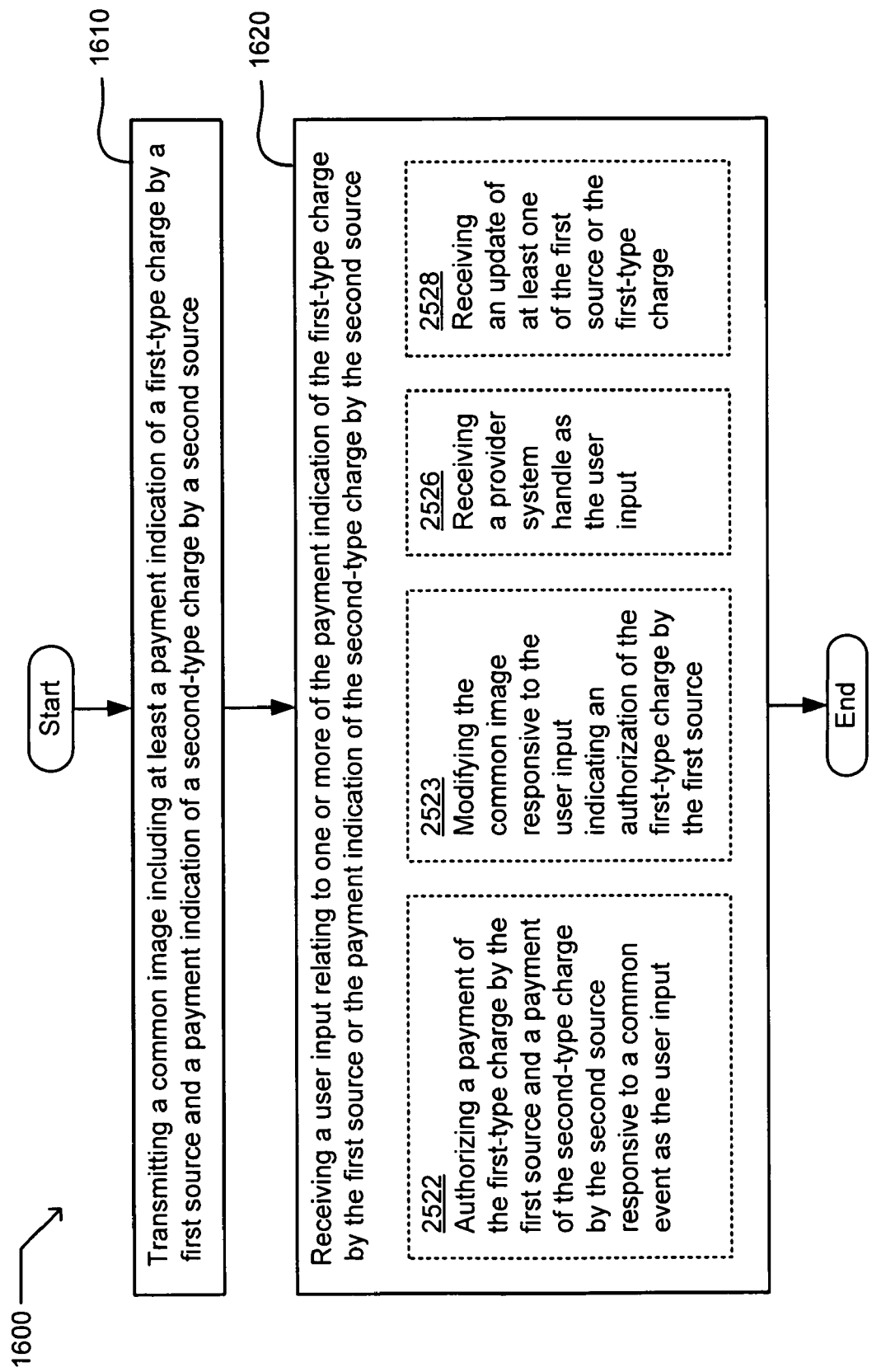

Referring now to FIG. 25, there are shown several variants of the flow 1600 of FIG. 16, 20, 21, 22, 23, or 24. Operation 1620—receiving a user input relating to one or more of the payment indication of the first-type charge by the first source or the payment indication of the second-type charge by the second source—may include one or more of the following operations: 2522, 2523, 2526, or 2528. Operation 2522 describes authorizing a payment of the first-type charge by the first source and a payment of the second-type charge by the second source responsive to a common event as the user input (e.g. authorization circuitry 132 authorizing plural payments responsive to button 213 or button 1553). This can occur, for example, in an implementation in which interface 120 performs operation 1610 and in which controller 130 performs operation 1620. In some embodiments, authorization circuitry 132 updates display 122 substantially immediately, or before receiving a successful payment confirmation.

Operation 2523 describes modifying the common image responsive to the user input indicating an authorization of the first-type charge by the first source (e.g. authorization circuitry 132 modifying a common grid to indicate a payment authorization of the first-type charge by the first source). In some embodiments, such a common grid resides in item/type list 141, for example, and such a modification can effectively replace image 210 (in which button 291 shows "OK") with image 1210 (in which the corresponding button 1291 shows "Pd").

Operation 2526 describes receiving a provider system handle as the user input. (e.g. input device(s) 126 receiving a URL, an access code, a protocol, or a selection thereof, effective for initiating contact with a server). In some embodiments, data module 140 uses such user inputs for accessing provider system 180 and other resources in network 170.

Operation 2528 describes receiving an update of at least one of the first source or the first-type charge (e.g. item/type list 141 receiving an indication that user 160 has requested an update of a charge through button 1442 or button 1542). In some embodiments, item/type list 141 performs operation 2528 by receiving an indication that user 160 has requested an update of a source through button 1443 or button 1543.

Figure 26:
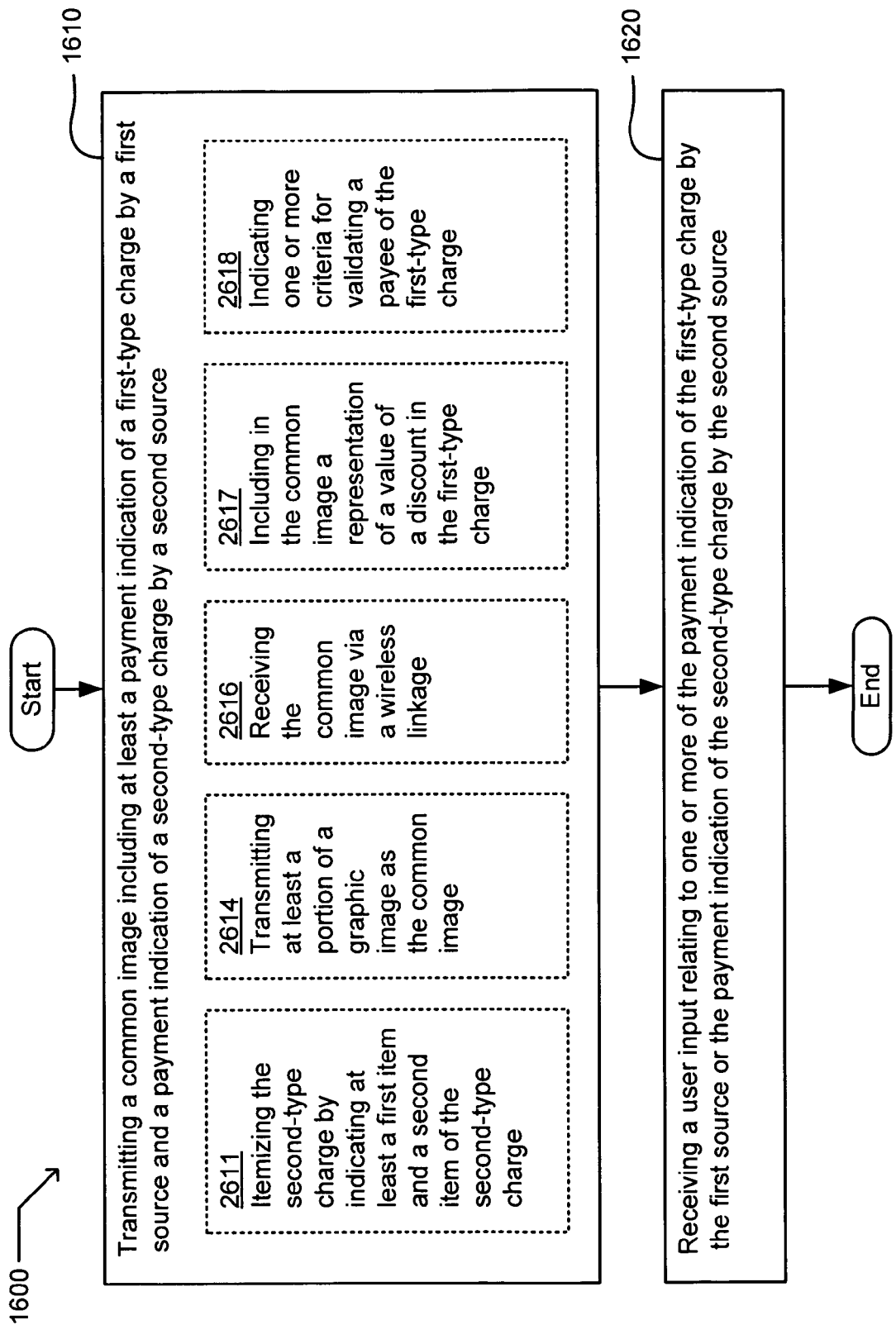

Referring now to FIG. 26, there are shown several variants of the flow 1600 of FIG. 16, 20, 21, 22, 23, 24, or 25. Operation 1610—transmitting a common image including at least a payment indication of a first-type charge by a first source and a payment indication of a second-type charge by a second source may include one or more of the following operations: 2611, 2614, 2616, 2617, or 2618. Operation 2611 describes itemizing the second-type charge by indicating at least a first item and a second item of the second-type charge (e.g. memory 124 storing or retrieving image 410, indicating several dining-type items as labeled on buttons 436, 437, & 438). This can occur, for example, in an implementation in which controller 130 performs operation 1610 and in which interface 120 performs operation 1620. In some embodiments, item/type list 141 or memory 124 itemizes such charges for later retrieval and transmission to display 122.

Operation 2614 describes transmitting at least a portion of a graphic image as the common image (e.g. display 122 showing image 210, indicating a dining-type charge by a voucher and a theatre-type charge by a home account). Alternatively or additionally, provider system 180 or mode selector 150 can perform operation 2614 by sending image 210 or the like, or a data portion of image 210 such as a two-dimensional array of scalar rankings. Alternatively or additionally, for a sight-impaired user, controller 130 can send the image as an audio signal to be played by interface 120.

Operation 2616 describes receiving the common image via a wireless linkage (e.g. data module 140 receiving the common image from provider system 180 via linkage 172 and linkage 182, either of which may be wireless linkages. This can occur, for example, in an implementation in which interface 120 receives the common image and then performs operation 1620. In some such implementations, for example, provider system 180 is in the same physical facility as user 160, such as a retail mall.

Operation 2617 describes including in the common image a representation of a value of a discount in the first-type charge (e.g. display 122 showing image 410, indicating a line item of a $2.42 senior discount on button 439). This can occur, for example, in an implementation in which interface 120 performs operation 1620. In some embodiments, an offset can be used to reduce or eliminate an item or other charge.

Operation 2618 describes indicating one or more criteria for validating a payee of the first-type charge (e.g. display 122 showing image 610, which includes selection control 683 with a scrollable list of permissible payees, one of which is "Tempo Bistro"). This can occur, for example, in an implementation in which controller 130 performs operation 1610 and in which interface 120 performs operation 1620. Alternatively or additionally, such a list can be downloaded (e.g. by use control circuitry 133 via network linkage 172).

Figure 27:
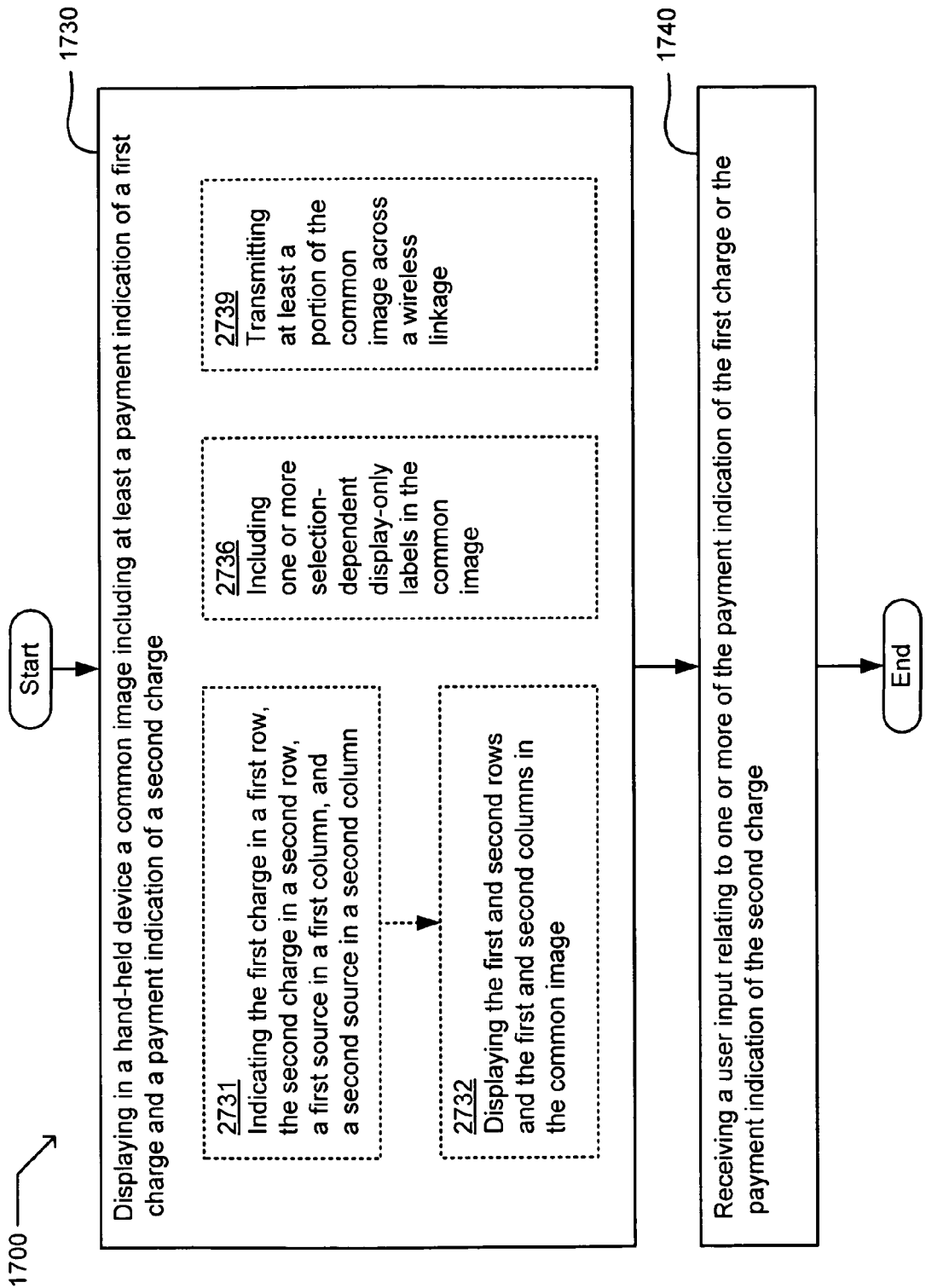
FIGS. 27-29 each depict several variants of the flow of FIG. 17.

Referring now to FIG. 27, there are shown several variants of the flow 1700 of FIG. 17. As shown in FIG. 27, Operation 1730—displaying in a hand-held device a common image including at least a payment indication of a first charge and a payment indication of a second charge—may include one or more of the following operations: 2731, 2732, 2736, or 2739. Operation 2731 describes indicating the first charge in a first row, the second charge in a second row, a first source in a first column, and a second source in a second column (e.g. memory 124 containing image 210 with several charge-indicative rows and several source-indicative columns). Operation 2732 describes displaying the first and second rows and the first and second columns in the common image (e.g. display 122 showing a portion of image 210 that includes a grid). This can occur, for example, in an implementation in which controller 130 performs operation 1730 and in which interface 120 performs operation 1740.

Operation 2736 describes including one or more selection-dependent display-only labels in the common image (e.g. display 122 showing provider label 431, transaction date label 432, or item type label 433 each responsive to button 436 or button 437 being selected). This can occur, for example, in an implementation in which controller 130 performs operation 1730 and in which interface 120 performs operation 1740.

Operation 2739 describes transmitting at least a portion of the common image across a wireless linkage (e.g. data module 140 transmitting one or more rankings or other values of image 210 via medium 115, which can be a wireless medium). This can occur, for example, in an implementation in which controller 130 performs operation 1730 and in which interface 120 performs operation 1740.

Figure 28:
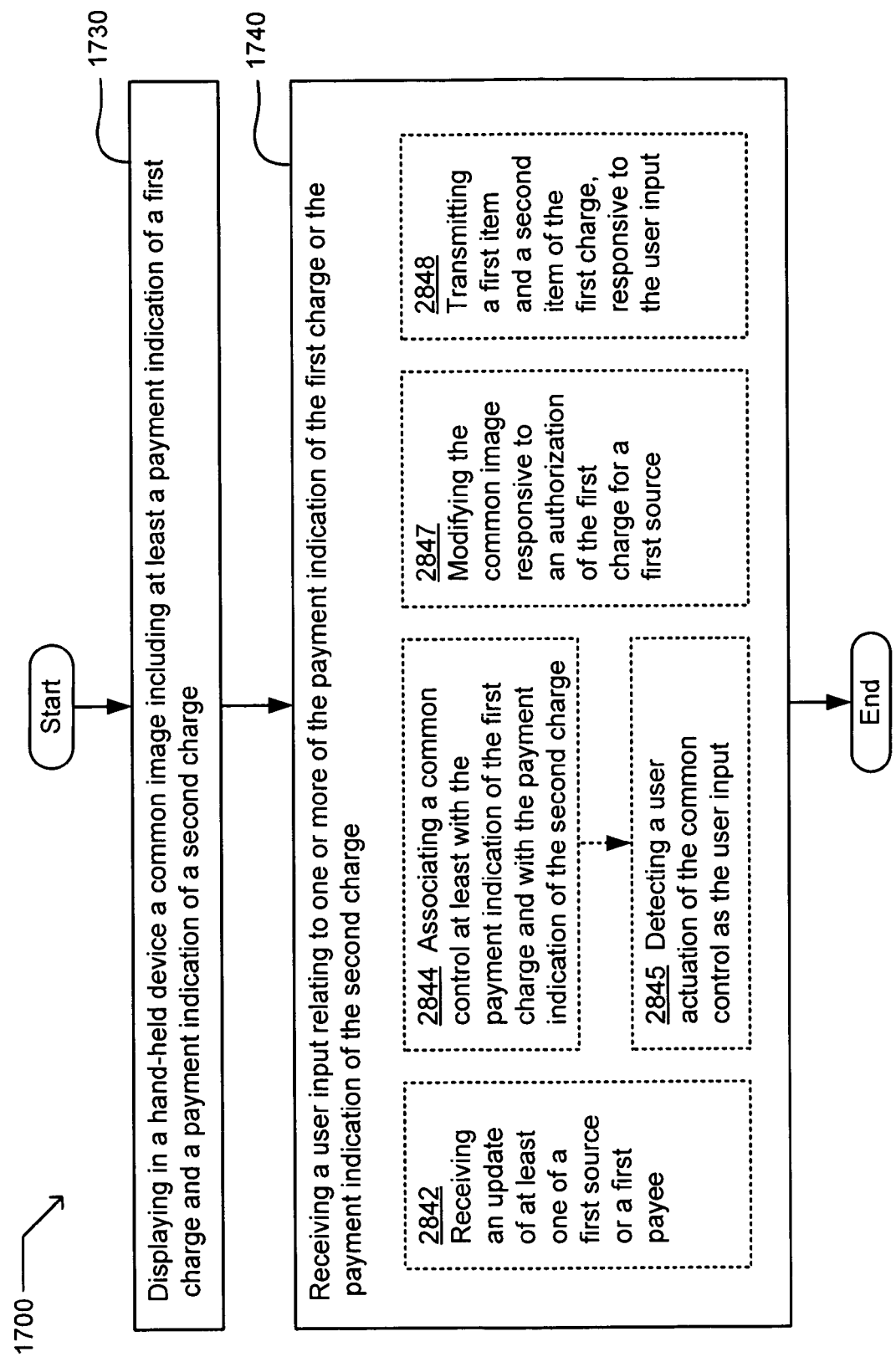

Referring now to FIG. 28, there are shown several variants of the flow 1700 of FIG. 17 or 27. As shown in FIG. 28, Operation 1740—receiving a user input relating to one or more of the payment indication of the first charge or the payment indication of the second charge—may include one or more of the following operations: 2842, 2844, 2845, 2847, or 2848. Operation 2842 describes receiving an update of at least one of a first source or a first payee (e.g. data module 140 updating item/type list 141 with a payee address). This can occur, for example, in an implementation in which interface 120 performs operation 1730 and in which controller 130 performs operation 1740.

Operation 2844 describes associating a common control at least with the payment indication of the first charge and with the payment indication of the second charge (e.g. memory 124 containing records with amounts, types and modes as shown in FIG. 15). This can occur, for example, in an implementation in which controller 130 performs operation 1730 and in which interface 120 performs operation 1740.

Operation 2845 describes detecting a user actuation of the common control as the user input (e.g. input device(s) 126 detecting an actuation of button 1553). In some implementations, operation 2844 is performed in lieu of operation 2845, of course, such as when a user does not activate the common control.

Operation 2847 describes modifying the common image responsive to an authorization of the first charge for a first source (e.g. authorization circuitry 132 modifying a common grid to indicate a payment authorization of the first-type charge by the first source). In some embodiments, such a common grid resides in item/type list 141, for example, and such a modification can effectively replace image 210 (in which button 291 shows "OK") with image 1210 (in which the corresponding button 1291 shows "Pd").

Operation 2848 describes transmitting a first item and a second item of the first charge, responsive to the user input (e.g. data module 140 transmitting itemized charges from item/type list 141 responsive to receiving a code indicating that button 374 was activated). The dining-type charge includes items of "Garlic pate," "Prawns," and "Sr. Discount" or the amounts thereof for example, in the illustration of FIG. 4.

Figure 29:
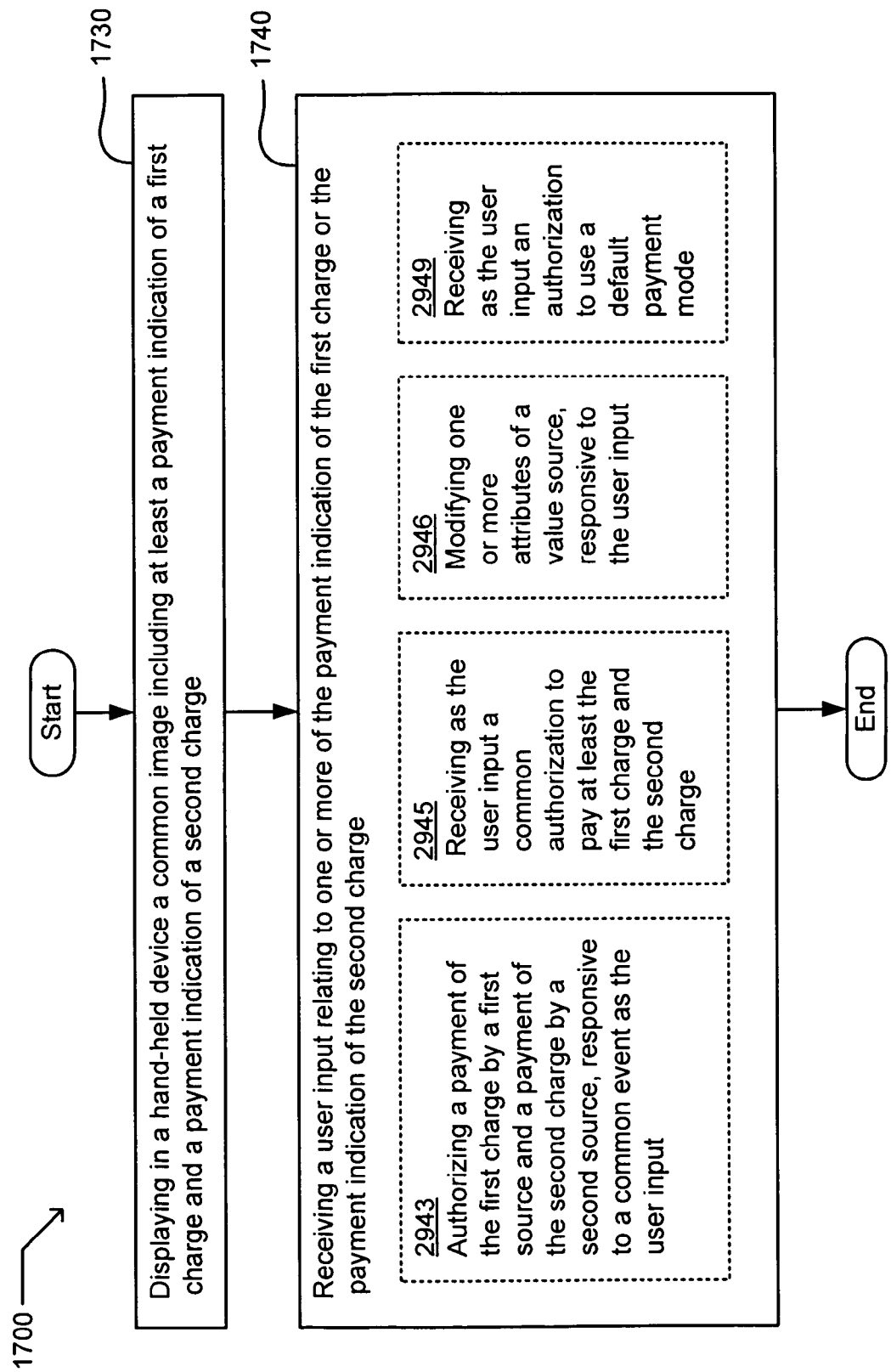

Referring now to FIG. 29, there are shown several variants of the flow 1700 of FIG. 17, 27, or 28. As shown in FIG. 29, Operation 1740—receiving a user input relating to one or more of the payment indication of the first charge or the payment indication of the second charge—may include one or more of the following operations: 2943, 2945, 2946, or 2949. Operation 2943 describes authorizing a payment of the first charge by a first source and a payment of the second charge by a second source, responsive to a common event as the user input (e.g. authorization circuitry 132 authorizing plural payments responsive to button 213 or button 1553). This can occur, for example, in an implementation in which interface 120 performs operation 1730 and in which operation 1740 is at least partly performed by controller 130. In some embodiments, authorization circuitry 132 updates display 122 substantially immediately, or at least before receiving a successful payment confirmation.

Operation 2945 describes receiving as the user input a common authorization to pay at least the first charge and the second charge (e.g. input device(s) 126 receiving an indication of an actuation of button 1553 or an actuation of button 213). Operation 2945 can optionally be performed some time after receiving the user input in some embodiments, for example, such as by an embodiment of provider system 180 in which flow 1700 is performed in a location remote from any user.

Operation 2946 describes modifying one or more attributes of a value source, responsive to the user input (e.g. use control circuitry 133 downloading one or more use restrictions of the "Voucher A4662" source via the worldwide web). In some embodiments, the user input is a password or command for such a download received via input device(s) 126 and transmitted via linkage 172, for example, to provider system 180 or some other system of network 170.

Operation 2949 describes receiving as the user input an authorization to use a default payment mode (e.g. authorization circuitry 132 can receive a "user preference" indication that all charges eligible for "Voucher A4662" be authorized for payment via that voucher upon receipt). This can occur, for example, in an implementation in which interface 120 performs operation 1730 and in which controller 130 performs operation 1740. Alternatively or additionally, one or more payment sources trigger a query to the user asking for a confirmation specific to one or more default payment modes.

It will be apparent to those skilled in the art that components like those of FIG. 1 can optionally be configured to perform one of the variants of flow 1600 with one or more optional operations of flow 1700, or vice versa. In such hybrid embodiments, for example, an indication of a user input can appropriately trigger more than one (optional) response, overlapping in time or otherwise in concert.

Figure 30:
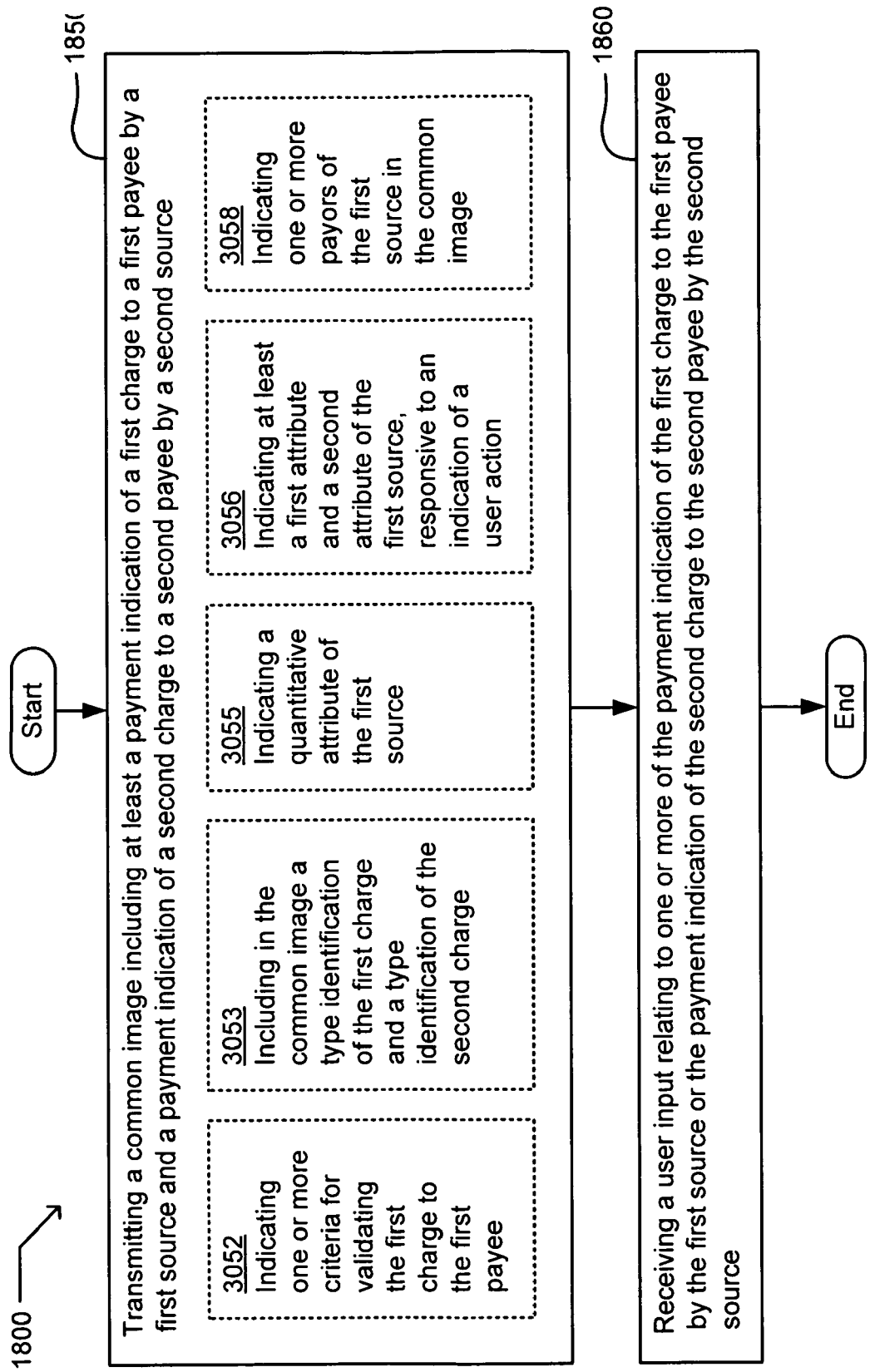
FIGS. 30-31 each depict several variants of the flow of FIG. 18.

Referring now to FIG. 30, there are shown several variants of the flow 1800 of FIG. 18. As shown in FIG. 30, Operation 1850—transmitting a common image including at least a payment indication of a first charge to a first payee by a first source and a payment indication of a second charge to a second payee by a second source—may include one or more of the following operations: 3052, 3053, 3055, 3056, or 3058. Operation 3052 describes indicating one or more criteria for validating the first charge to the first payee (e.g. display 122 showing image 610, which includes selection control 683 with a scrollable list of permissible payees, one of which is "Tempo Bistro"). This can occur, for example, in an implementation in which controller 130 performs operation 1850 and in which interface 120 performs operation 1860. Alternatively or additionally, such a list can be downloaded (e.g. by use control circuitry 133 via network linkage 172).

Operation 3053 describes including in the common image a type identification of the first charge and a type identification of the second charge (e.g. data module 140 receiving, storing, retrieving, or transmitting image 210, which includes payment indications of a theatre-type charge by a home account and of a dining-type charge by a voucher).

Operation 3055 describes indicating a quantitative attribute of the first source (e.g. data module 140 downloading or computing capacity information as indicated in FIG. 6, indicating a balance from a source identified as "Voucher A4662"). Alternatively or additionally, the quantitative attribute can include a per diem or per-charge limit, a surcharge, a usage count, a total capacity, a balance, an interest rate, a penalty, a usage fee, or the like. In some embodiments, one or more of the sources can exclude any quantitative attribute.

Operation 3056 describes indicating at least a first attribute and a second attribute of the first source, responsive to an indication of a user action (e.g. attribute coding 142 transmitting an interest rate, a privacy attribute, or a formula attribute as shown in FIG. 13, responsive to an actuation of button 1224 of FIG. 12). This can occur, for example, in an implementation in which interface 120 performs operation 1850 and in which controller 130 performs operation 1860.

Operation 3058 describes indicating one or more payors of the first source in the common image (e.g. data module 140 generating, retrieving, receiving, or otherwise obtaining screen image 1010, which indicates "Company" within button 222). In some such embodiments, operation 2311 includes receiving a name attribute (e.g. "BLTG MC") and other attributes of a source (a company account, e.g.) via a network linkage such as linkage 172.

Figure 31:
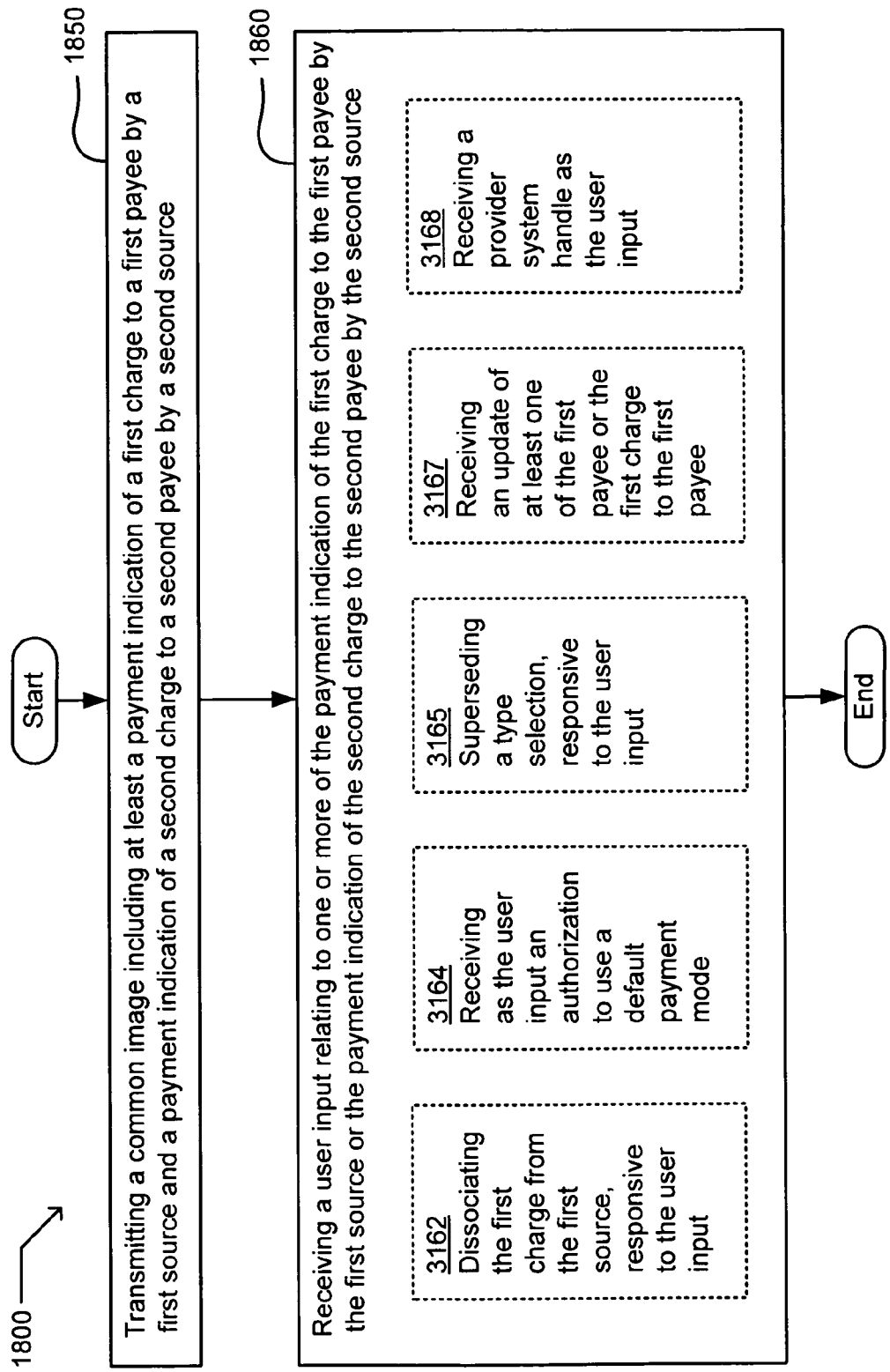

Referring now to FIG. 31, there are shown several variants of the flow 1800 of FIG. 18 or 30. As shown in FIG. 31, operation 1860—receiving a user input relating to one or more of the payment indication of the first charge to the first payee by the first source or the payment indication of the second charge to the second payee by the second source—may include one or more of the following operations: 3162, 3164, 3165, 3167, or 3168. Operation 3162 describes dissociating the first charge from the first source, responsive to the user input (e.g. mode selector 150 responding to a reduction of the ranking of "Cash Source" by dissociating the $45.00 charge from "Cash Source," in the example of FIG. 9). In a transition from image 210 to image 910, such a dissociation is represented by button 291 turning solid gray, relative to the higher-ranking appearance ("OK") of button 291 in FIG. 2.

As an example of a further dissociation, referring to FIG. 12, there it is shown that the "Home Account" source has been completely dissociated from the "unspecified"-type charge responsive to a user input authorizing that charge to be paid from "Cash Source." (See the explanation of FIG. 12 above.)

Operation 3164 describes receiving as the user input an authorization to use a default payment mode (e.g. authorization circuitry 132 can receive a "user preference" indication that all charges eligible for "Voucher A4662" be authorized for payment via that voucher upon receipt). This can occur, for example, in an implementation in which interface 120 performs operation 1850 and in which controller 130 performs operation 1860. Alternatively or additionally, one or more payment sources trigger a query to the user asking for a confirmation specific to one or more default payment modes.

Operation 3165 describes superseding a type selection, responsive to the user input (e.g. data module 140 responding to an indication that "Merlot" should be not be a dining-type item, in the example of FIG. 4). In some embodiments, data module 140 may transmit a categorization request (remotely via linkage 172, e.g.) including an item descriptor and await a suggested category name (e.g. "Liquor") from a server. Alternatively or additionally, data module 140 may transmit a user query responsive to such an indication, permitting a user to input or validate a new type label.

Operation 3167 describes receiving an update of at least one of the first payee or the first charge to the first payee (e.g. item/type list 141 receiving an indication that user 160 has requested an update of a charge through button 1442 or button 1542). In some embodiments, item/type list 141 performs operation 3167 by receiving an indication that user 160 has requested an update of a source through button 1443 or button 1543.

Operation 3168 describes receiving a provider system handle as the user input (e.g. input device(s) 126 receiving a URL, an access code, a protocol, or a selection thereof, effective for initiating contact with a server). In some embodiments, data module 140 uses such user inputs for accessing provider system 180 and other resources in network 170.

It will be apparent to those skilled in the art that components like those of FIG. 1 can optionally be configured to perform one of the variants of flow 1700 with one or more optional operations of flow 1800, or vice versa. In such hybrid embodiments, for example, an indication of a user input can appropriately trigger more than one (optional) response, overlapping in time or otherwise in concert.

Figure 32:
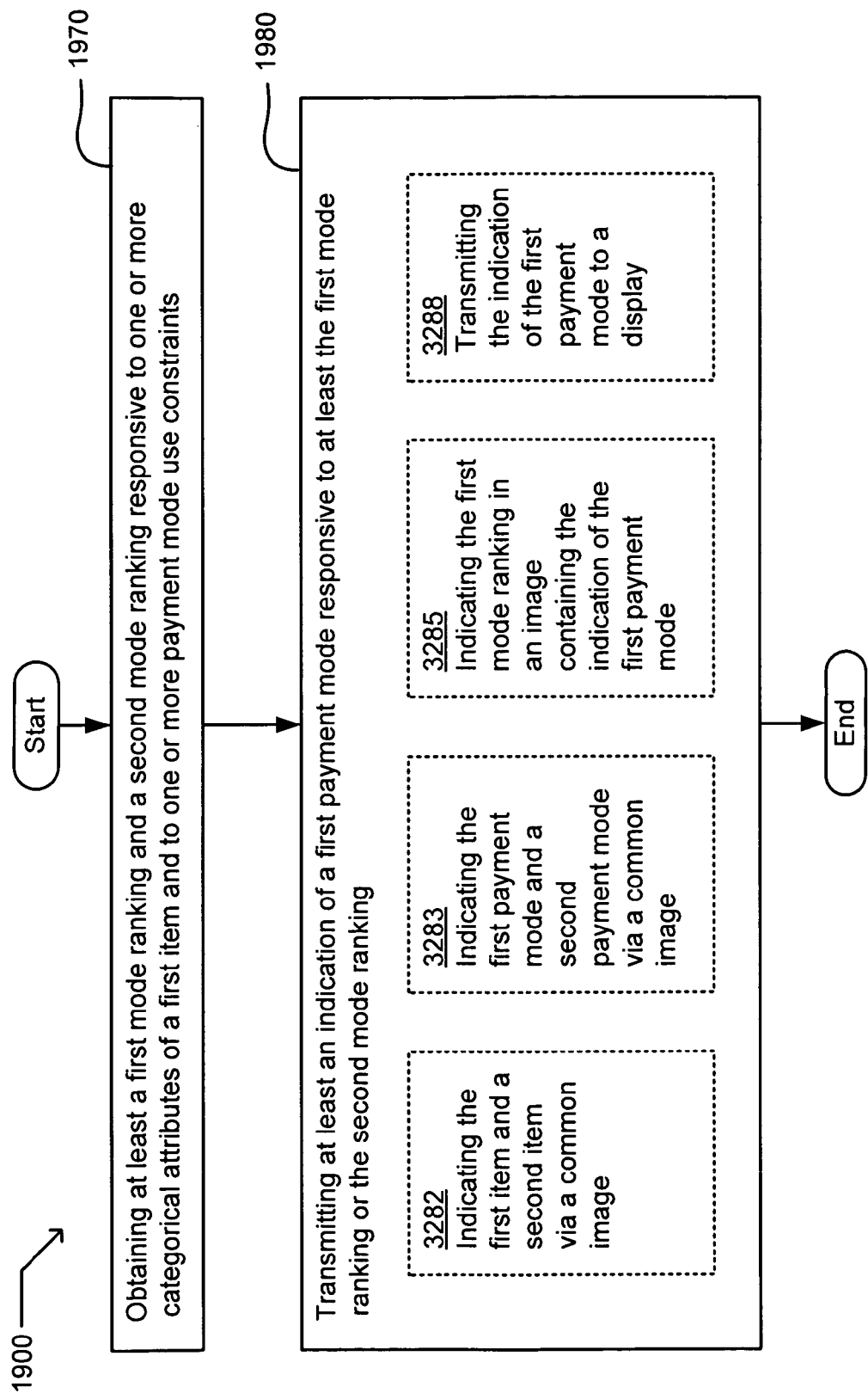

Referring now to FIG. 32, there are shown several variants of the flow 1900 of FIG. 19. As shown in FIG. 32, operation 1980—transmitting at least an indication of a first payment mode responsive to at least the first mode ranking or the second mode ranking—may include one or more of the following operations: 3282, 3283, 3285, or 3288. Operation 3282 describes indicating the first item and a second item via a common image (e.g. display 122 or memory 124 indicating button 234 and button 235, respectively indicating "lodging" and "theatre" line items). This can occur, for example, in an implementation in which controller 130 performs operation 1970 and in which interface 120 performs operation 1980.

Operation 3283 describes indicating the first payment mode and a second payment mode via a common image (display 122 showing button 1543 and button 1546 of image 1510 of FIG. 15, each showing a respective mode).

Operation 3285 describes indicating the first mode ranking in an image containing the indication of the first payment mode (e.g. display 122 showing image 210 in which button 294 indicates a most-preferred ranking of "OK" rather than a less-preferred ranking of a gray circle or a least-preferred ranking of a white space). This can occur, for example, in an implementation in which controller 130 performs operation 1970 and in which interface 120 performs operation 1980.

Operation 3288 describes transmitting the indication of the first payment mode to a display (e.g. memory 124 or mode selector 150 transmitting "Company Account" or "Visa" to display 122). In some embodiments, the transmission is indirect, such as those in which mode selector 150 transmits the indication(s) to memory 124 for relaying to a display.

Figure 33:
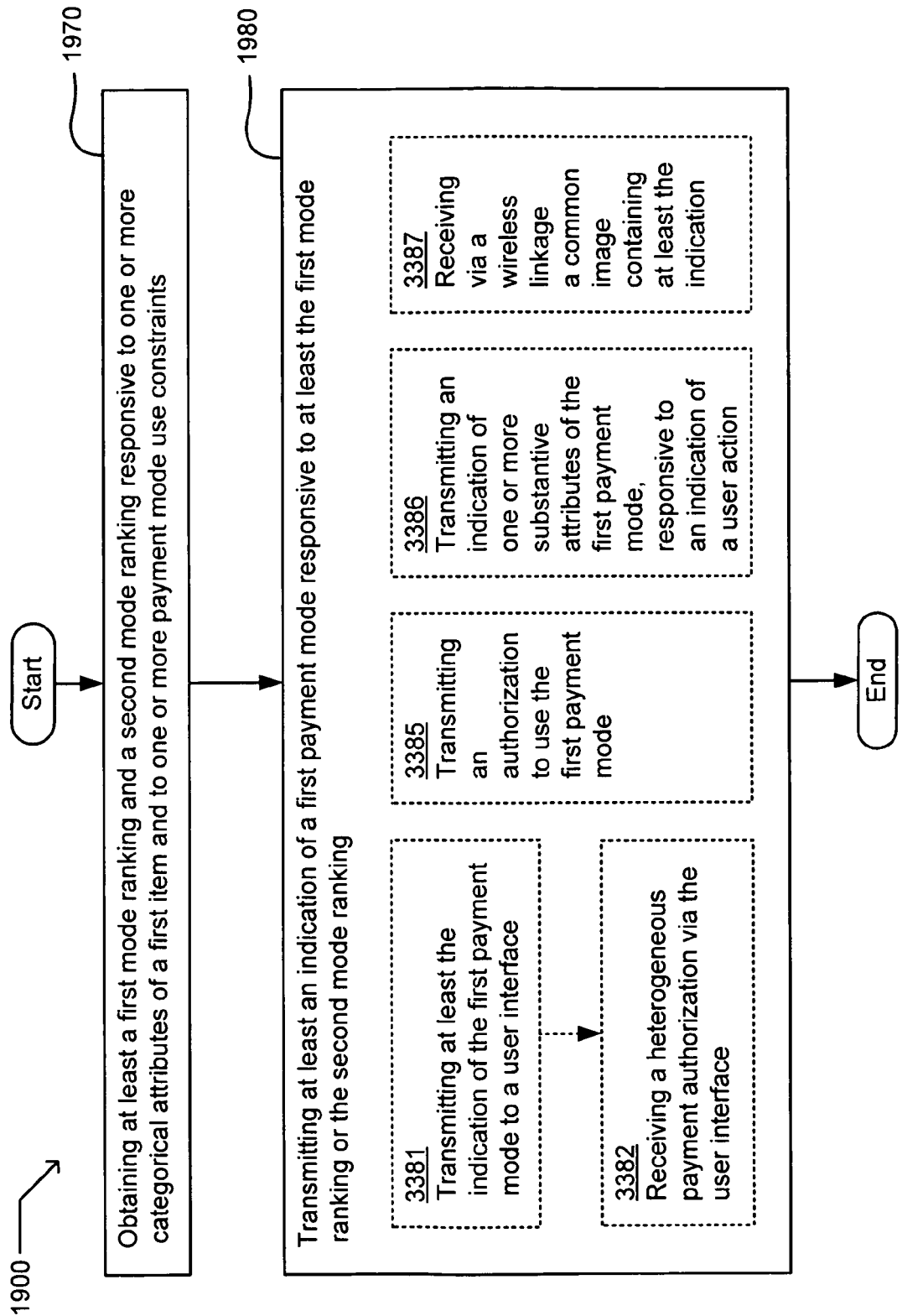

Referring now to FIG. 33, there are shown several variants of the flow 1900 of FIG. 19 or 32. As shown in FIG. 33, operation 1980—transmitting at least an indication of a first payment mode responsive to at least the first mode ranking or the second mode ranking—may include one or more of the following operations: 3381, 3382, 3385, 3386, or 3387. Operation 3381 describes transmitting at least the indication of the first payment mode to a user interface (e.g. mode selector 150 transmitting image 210, or at least some of its numerical content, to interface 120).

Alternatively or additionally, flow 1900 can include operation 3382—receiving a heterogeneous payment authorization via the user interface (e.g. authorization circuitry 132 receiving from interface 120 an indication of an actuation of button 213). In some embodiments, authorization circuitry 132 responds to such an indication by simultaneously transmitting authorizations for payments from different sources for different charge types. Alternatively or additionally, authorization circuitry 132 can be configured to ask user 160 to provide a confirmation before authorizing each such payment in turn.

Operation 3385 describes transmitting an authorization to use the first payment mode (e.g. authorization circuitry 132 can transmit an authorization to provider system 180 for all of the "Home Account" charges indicated in image 210). This can occur, for example, in an implementation in which interface 120 performs operation 1970 and in which controller 130 performs operation 1980. Alternatively or additionally, image 210 can then be modified to exclude all indications of the authorized "Home Account" charges.

Operation 3386 describes transmitting an indication of one or more substantive attributes of the first payment mode, responsive to an indication of a user action (e.g. attribute coding 142 transmitting an interest rate, a maximum balance, a current balance, a recent event date, or the like, responsive to button 1443). This can occur, for example, in an implementation in which interface 120 performs operation 1970 and in which controller 130 performs operation 1980.

Operation 3387 describes receiving via a wireless linkage a common image containing at least the indication (e.g. data module 140 receiving the common image from provider system 180 via linkage 172, which may be a wireless linkage). In some embodiments, a signal containing the common image can be received from provider system 180 via a direct wireless connection, which image is (then or later) forwarded to interface 120 for display.

Figure 34:
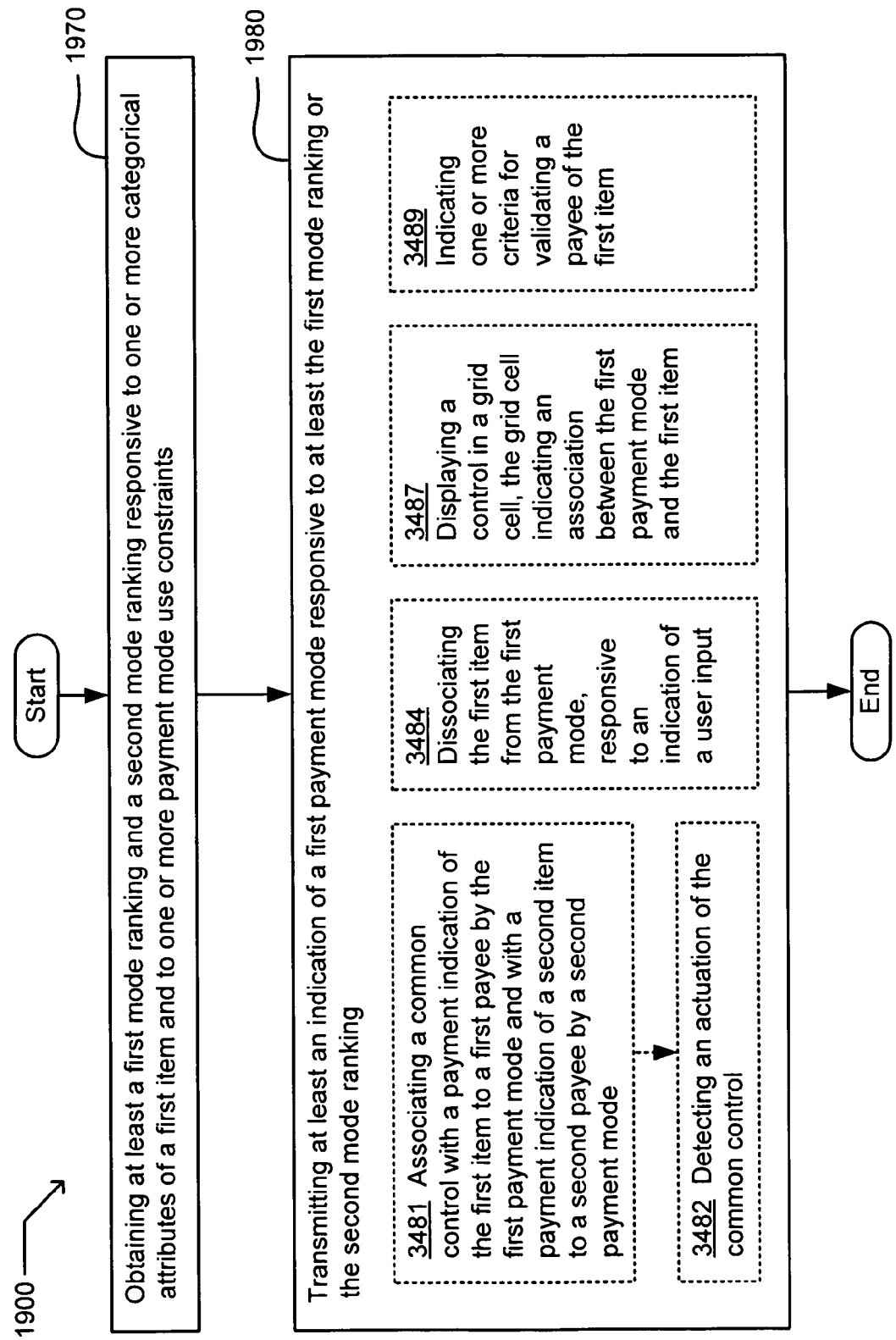

Referring now to FIG. 34, there are shown several variants of the flow 1900 of FIG. 19, 32, or 33. As shown in FIG. 34, operation 1980—transmitting at least an indication of a first payment mode responsive to at least the first mode ranking or the second mode ranking—may include one or more of the following operations: 3481, 3482, 3484, 3487, or 3489. Operation 3481 describes associating a common control with a payment indication of the first item to a first payee by the first payment mode and with a payment indication of a second item to a second payee by a second payment mode (e.g. memory 124 containing image 210, which includes "Yes to all" button 213). This can occur, for example, in an implementation in which controller 130 performs operation 1970 and in which interface 120 performs operation 1980.

Operation 3482 describes detecting an actuation of the common control (e.g. input device(s) 126 detecting an actuation of "Yes to all" button 213). In some embodiments, this is effectively similar to authorizing all of the charges indicated in image 210 with "OK" buttons.

Operation 3484 describes dissociating the first item from the first payment mode, responsive to an indication of a user input (e.g. mode selector 150 responding to a reduction of the ranking of "Cash Source" by dissociating the $45.00 ("unspecified"-type) charge from "Cash Source." In the embodiment of FIG. 9, for example, such a dissociation is manifested by button 291 turning solid gray, relative to the higher-ranking appearance of button 291 in FIG. 2. Referring again to FIG. 12, there it is shown that the "Home Account" source has been dissociated from the "unspecified"-type charge responsive to a user input authorizing that charge to be paid from "Cash Source," as explained above with reference to FIG. 12.

Operation 3487 describes displaying a control in a grid cell, the grid cell indicating an association between the first payment mode and the first item (e.g. display 122 showing image 210, indicating a dining-type charge by a voucher and a theatre-type charge by a home account). This can occur, for example, in an implementation in which controller 130 performs operation 1970. Alternatively or additionally, provider system 180 or data module 140 can perform operation 3487 by sending image 210 or the like, or a data portion of image 210 such as a two-dimensional array of scalar rankings. Alternatively or additionally, for a sight-impaired user, controller 130 can send the image as an audio signal to be played by interface 120.

Operation 3489 describes indicating one or more criteria for validating a payee of the first item (e.g. display 122 showing image 610, which includes selection control 683 with a scrollable list of permissible payees, one of which is "Tempo Bistro"). This can occur, for example, in an implementation in which interface 120 performs operation 1980, and in which operation 1970 is performed by controller 130 or provider system 180. In some implementations, the one or more criteria for validating a payee can include confirming that the payee's telephone number is listed, contacting the payee (provider system 180, e.g.), by contacting a central system for validation against a current payee list, or the like.

Figure 35:
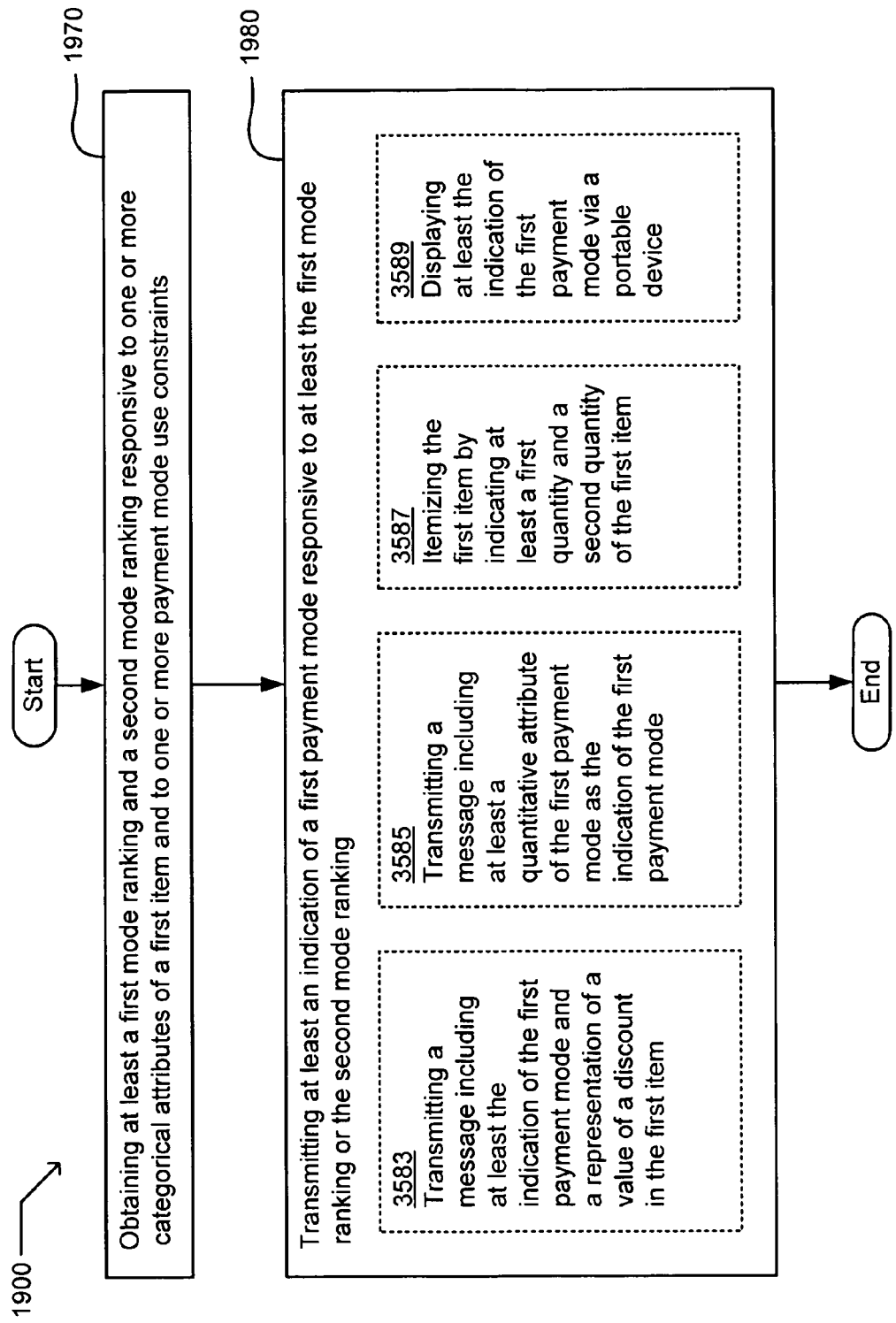

Referring now to FIG. 35, there are shown several variants of the flow 1900 of FIG. 19, 32, 33, or 34. As shown in FIG. 35, operation 1980—transmitting at least an indication of a first payment mode responsive to at least the first mode ranking or the second mode ranking—may include one or more of the following operations: 3583, 3585, 3587, or 3589. Operation 3583 describes transmitting a message including at least the indication of the first payment mode and a representation of a value of a discount in the first item (e.g. display 122 showing a message including image 410, indicating a line item of a $2.42 discount on button 439). This can occur, for example, in an implementation in which controller 130 performs operation 1970 and in which interface 120 performs operation 1980. In some embodiments, a discount, rebate, or similar quantitative adjustment can be used to simplify the administration of an appropriate net charge.

Operation 3585 describes transmitting a message including at least a quantitative attribute of the first payment mode as the indication of the first payment mode (e.g. data module 140 containing records in item/list including interest rates, a maximum balance, a penalty or finance charge, or other quantitative attributes of interest). This can occur, for example, in an implementation in which interface 120 performs operation 1970. In some embodiments, one or more of the sources can include accounts of different owners, facilitating cost sharing according to any desired system.

Operation 3587 describes itemizing the first item by indicating at least a first quantity and a second quantity of the first item (e.g. data module 140 containing such records in item/type list 141, such as the dining item breakdown shown in FIG. 4). This can occur, for example, in an implementation in which interface 120 performs operation 1970 and in which controller 130 performs operation 1980. In some implementations, item/type list 141 contains multiple levels of hierarchical groupings of such items.

Operation 3589 describes displaying at least the indication of the first payment mode via a portable device (e.g. display 122 can propose a payment mode). This can occur, for example, in an implementation in which controller 130 performs operation 1970. Operation 1980 can be performed via interface 120, which can conveniently be implemented as a watch, PDA, or similar portable device.

Figure 36:
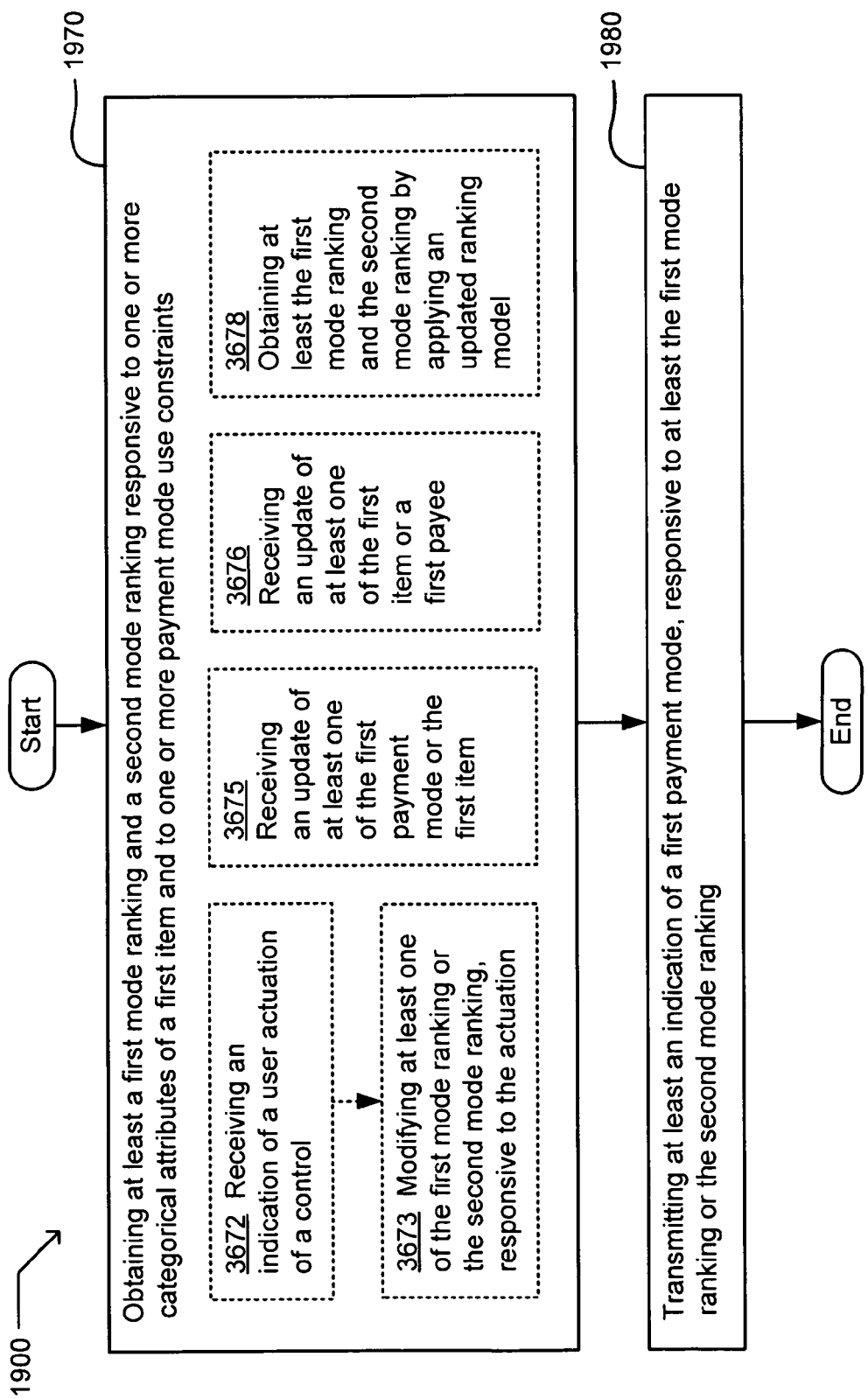

Referring now to FIG. 36, there are shown several variants of the flow 1900 of FIG. 19, 32, 33, 34, or 35. As shown in FIG. 36, operation 1970—obtaining at least a first mode ranking and a second mode ranking responsive to one or more categorical attributes of a first item and to one or more payment mode use constraints—may include one or more of the following operations: 3672, 3673, 3675, 3676, or 3678. Operation 3672 describes receiving an indication of a user actuation of a control (e.g. medium 115 and ranking circuitry 154 receiving an indication that user 160 prefers highest mode ranking of "BLTG MC" for all charges having a payee of "Jet Blue"). This can occur, for example, in an implementation in which interface 120 performs operation 1980.

Operation 3673 describes modifying at least one of the first mode ranking or the second mode ranking, responsive to the actuation (e.g. ranking circuitry 154 changing assigning pending charges having a payee of "Delta Airlines"). In some embodiments, ranking circuitry generates rankings that depend on a vendor or service attribute.

Operation 3675 describes receiving an update of at least one of the first payment mode or the first item (e.g. item/type list 141 receiving an indication that button 487 has been actuated so that "Merlot" will be removed as a dining-type charge). This can occur, for example, in an implementation in which controller 130 performs operation 1970 and in which interface 120 is used in performing operation 1980.

Operation 3676 describes receiving an update of at least one of the first item or a first payee (e.g. item/type list 141 receiving an indication that the first payee has been changed from "Delta" to "Delta Airlines"). In some embodiments, controller 130 is used in performing operation 3676, receiving a download to item/type list 141 via linkage 172.

Operation 3678 describes obtaining at least the first mode ranking and the second mode ranking by applying an updated ranking model (e.g. ranking circuitry 154 downloading specs on a new lower-interest credit card via linkage 172, and automatically ranking the new source more highly than existing ones, in an interest-minimizing ranking model). Alternatively or additionally, a ranking model may combine several factors arithmetically, such as by preferring lower-privacy or lower-available-balance sources.

Figure 37:
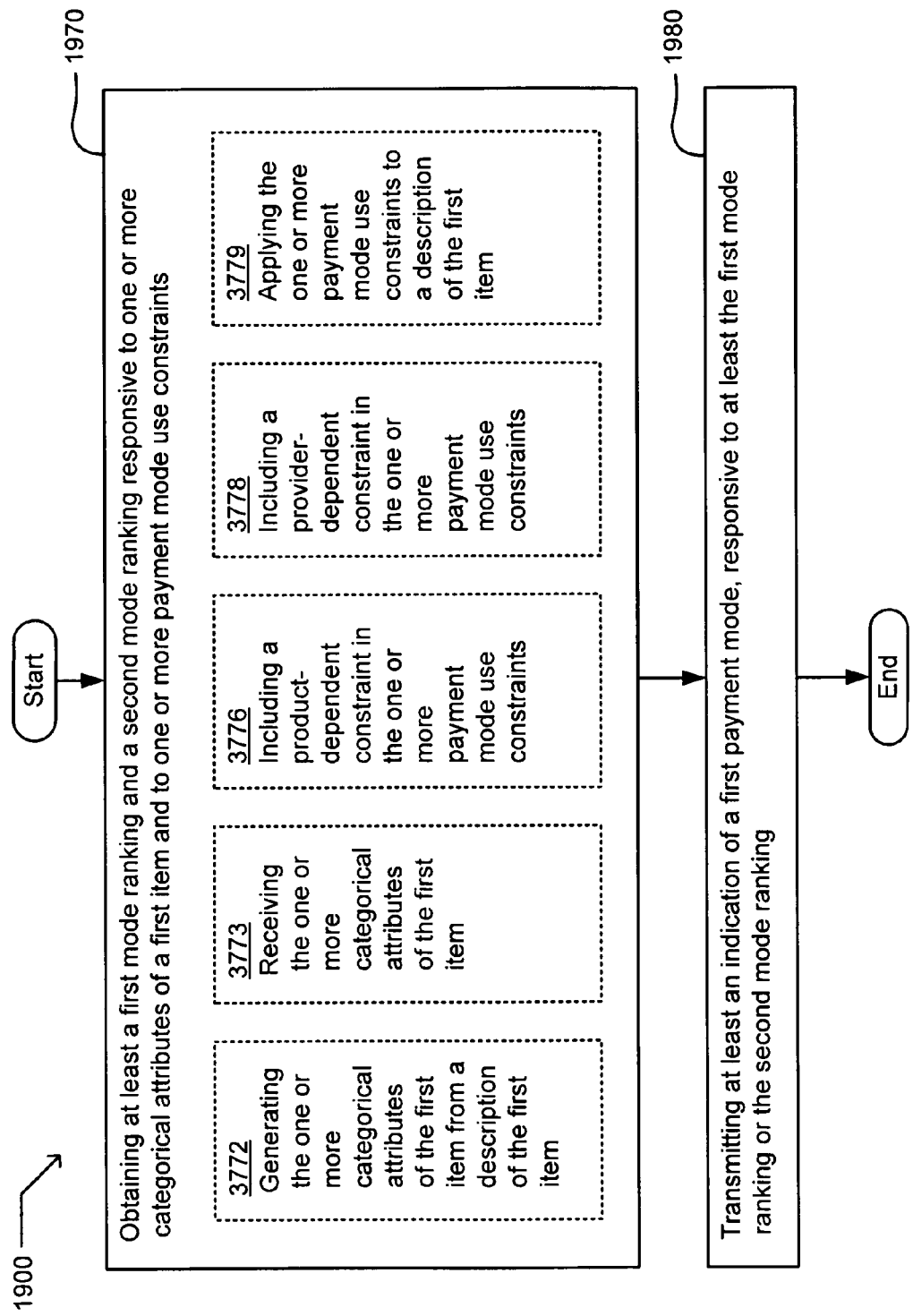

Referring now to FIG. 37, there are shown several variants of the flow 1900 of FIG. 19, 32, 33, 34, 35, or 36. As shown in FIG. 37, operation 1970—obtaining at least a first mode ranking and a second mode ranking responsive to one or more categorical attributes of a first item and to one or more payment mode use constraints—may include one or more of the following operations: 3772, 3773, 3776, 3778, or 3779. Operation 3772 describes generating the one or more categorical attributes of the first item from a description of the first item (e.g. data module 140 distilling an electronic bill into one or more categorical attributes like "monthly," "finance charge," "business expense," "legal," "travel," and the like, and storing the result in attribute coding 142). This can occur, for example, in an implementation in which controller 130 performs operation 1970 and in which interface 120 is used in performing operation 1980.

Operation 3773 describes receiving the one or more categorical attributes of the first item (e.g. attribute coding 142 directly receiving one or more non-price attributes like "service," "residential," "connection charge," and the like). Such attributes can arrive via linkage 172, for example, as a bill, message, data block, or the like.

Operation 3776 describes including a product-dependent constraint in the one or more payment mode use constraints (e.g. use control circuitry 133 defining a disallowance or other special treatment response to a product identification containing a string of "tobacco" or "cigar"). This can occur, for example, in an implementation in which interface 120 is used in performing operation 1980.

Operation 3778 describes including a provider-dependent constraint in the one or more payment mode use constraints (e.g. use control circuitry 133 defining a password lockout or other special treatment response to a provider identification containing a string of "night club" or an area code that is not 206). In some embodiments, the special treatment comprises transmitting the provider identification to a network (network 170, e.g.) for further processing. For example, one or more elements of network 170 (servers, e.g.) may be configured to transmit a result of applying one or more contingent constraints (including one or more provider-dependent constraints, e.g., applying a comprehensive list of acceptable provider phone numbers or addresses). In some embodiments, ranking circuitry 154 is configured to receive and use such a result for generating one or more of the mode rankings.

Operation 3779 describes applying the one or more payment mode use constraints to a description of the first item (e.g. use control circuitry 133 defining a rebate, discount, or other special treatment responsive to an item description indicating an educational or charitable purpose). In some embodiments, ranking circuitry 154 can implement the special treatment as a differential ranking so that such an item will receive a higher ranking or so that other items will receive a lower ranking.

Referring now to FIG. 38, there are shown several variants of the flow 1900 of FIG. 19, 32, 33, 34, 35, 36, or 37. As shown in FIG. 38, operation 1970—obtaining at least a first mode ranking and a second mode ranking responsive to one or more categorical attributes of a first item and to one or more payment mode use constraints—may include one or more of the following operations: 3871, 3873, 3875, 3877, or 3878. Operation 3871 describes including in a common image a type identification of the first item and a type identification of a second item (e.g. data module 140 receiving, storing, retrieving, or transmitting image 210, which includes payment indications of a theatre-type charge by a home account and of a dining-type charge by a voucher).

Operation 3873 describes transmitting a first component and a second component of the first item, responsive to an indication of a user input (e.g. data module 140 transmitting itemized charges from item/type list 141 responsive to receiving a code indicating that button 374 was activated). The dining-type charge includes items of "Garlic pate," "Prawns," and "Sr. Discount" or the amounts thereof for example, in the illustration of FIG. 4.

Operation 3875 describes spawning a second item from the first item, responsive to an indication of a user input (e.g. data module 140 responding to an indication of an activation of button 487 by moving the $5.00 charge from the dining-type charge into a new-type charge). This can occur, for example, in an implementation in which interface 120 performs operation 1970 and in which controller 130 performs operation 1980. Optionally a default name ("Liquor" or "Dining2", e.g.) can be assigned as a type label of the spawned charge by data module 140. In some embodiments, a data module requests a confirmation or new name responsive to the spawning (via interface 120, e.g.).

Operation 3877 describes receiving at least the first mode ranking and the second mode ranking from a network (e.g. ranking circuitry 154 merely receiving and storing the rankings via linkage 172, rather than selecting or otherwise deriving them). This can occur, for example, in an implementation in which interface 120 performs operation 1970.

Operation 3878 describes updating at least one of the one or more payment mode use constraints, responsive to an indication of a user input (e.g. use control circuitry 133 downloading one or more use restrictions of the "Voucher A4662" source via the linkage 172). In some embodiments, the user input is a password or command for such a download received via input device(s) 126 and transmitted via linkage 172, for example, to provider system 180 or some other system of network 170.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "can" and "optionally" and other permissive terms are used herein for describing optional features of various embodiments. These terms likewise describe selectable or configurable features generally, unless the context dictates otherwise.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly.

What is claimed is:

1. A system comprising:
a processor for obtaining at least a first mode ranking and a second mode ranking responsive to one or more categorical attributes of a first item and to one or more payment mode use constraints; and
a transmitter arranged to transmit at least an indication of a first payment mode responsive to at least the first mode ranking or the second mode ranking, wherein the transmitter arranged to transmit at least an indication of a first payment mode responsive to at least the first mode ranking or the second mode ranking comprises:

a display for displaying an indication of the first payment mode and a second payment mode via a common image, wherein the indication is displayed using a button of a first common control or a second common control to authorize a payment using a payment mode identified by a received user input to one of the first item and a second item identified by the received user input, wherein the first common control relates at least the indication of the first item and the second item to the first payment mode, and wherein the second common control relates at least the indication of the first item and the second item to a second payment mode.

2. The system of claim 1, in which the transmitter arranged to transmit at least an indication of a first payment mode responsive to at least the first mode ranking or the second mode ranking comprises:
 a transmitter arranged to transmit the indication of the first payment mode responsive to at least the first mode ranking or the second mode ranking to a user interface; and
 circuitry for receiving a heterogeneous payment authorization via the user interface.

3. The system of claim 2, in which the transmitter arranged to transmit the indication of a first payment mode responsive to at least the first mode ranking or the second mode ranking comprises:
 circuitry for transmitting an indication of one or more substantive attributes of the first payment mode, responsive to an indication of a user action.

4. The system of claim 2, in which the transmitter arranged to transmit the indication of a first payment mode responsive to at least the first mode ranking or the second mode ranking comprises:
 circuitry for dissociating the first item from the first payment mode, responsive to an indication of a user input.

5. The system of claim 2, in which the transmitter arranged to transmit the indication of a first payment mode responsive to at least the first mode ranking or the second mode ranking comprises:
 circuitry for indicating one or more criteria for validating a payee of the first item.

6. The system of claim 2, in which the transmitter arranged to transmit the indication of a first payment mode responsive to at least the first mode ranking or the second mode ranking comprises:
 circuitry for transmitting a message including at least a quantitative attribute of the first payment mode as the indication of the first payment mode.

7. The system of claim 1, in which the transmitter arranged to transmit at least an indication of a first payment mode responsive to at least the first mode ranking or the second mode ranking comprises:
 a transmitter arranged to transmit an authorization to use the first payment mode responsive to at least the first mode ranking or the second mode ranking.

8. The system of claim 1, in which the transmitter arranged to transmit at least an indication of a first payment mode responsive to at least the first mode ranking or the second mode ranking comprises:
 a receiver arranged to receive via a wireless linkage a common image containing at least the indication.

9. The system of claim 1, in which the transmitter arranged to transmit at least an indication of a first payment mode responsive to at least the first mode ranking or the second mode ranking comprises:
 a processor arranged to dissociate the first item from the first payment mode, responsive to an indication of a user input.

10. The system of claim 1, in which the display for indicating the first payment mode and a second payment mode via a common image comprises:
 a display for displaying a control in a grid cell, the grid cell indicating an association between the first payment mode and the first item.

11. The system of claim 1, in which the transmitter arranged to transmit at least an indication of a first payment mode responsive to at least the first mode ranking or the second mode ranking comprises:
 a processor arranged to evaluate one or more criteria for validating a payee of the first item.

12. The system of claim 1, in which the transmitter arranged to transmit at least an indication of a first payment mode responsive to at least the first mode ranking or the second mode ranking comprises:
 a transmitter arranged to transmit a message including at least the indication of the first payment mode and a representation of a value of a discount in the first item.

13. The system of claim 1, in which the transmitter arranged to transmit at least an indication of a first payment mode responsive to at least the first mode ranking or the second mode ranking comprises:
 a transmitter arranged to transmit a message including at least a quantitative attribute of the first payment mode as the indication of the first payment mode.

14. The system of claim 1, in which the display for indicating the first payment mode and a second payment mode via a common image comprises:
 a display arranged to display at least the indication of the first payment mode via a portable device.

15. The system of claim 1, in which the processor for obtaining at least a first mode ranking and a second mode ranking responsive to one or more categorical attributes of a first item and to one or more payment mode use constraints comprises:
 a processor for receiving an indication of a user actuation of a control; and
 a processor arranged to modify at least one of the first mode ranking or the second mode ranking, responsive to the user actuation.

16. The system of claim 1, in which the processor for obtaining at least a first mode ranking and a second mode ranking responsive to one or more categorical attributes of a first item and to one or more payment mode use constraints comprises:
 a processor arranged to receive an update of at least one of the first payment mode or the first item.

17. The system of claim 1, in which the processor for obtaining at least a first mode ranking and a second mode ranking responsive to one or more categorical attributes of a first item and to one or more payment mode use constraints comprises:
 a processor arranged to obtain at least the first mode ranking and the second mode ranking by applying an updated ranking model.

18. The system of claim 1, in which the processor for obtaining at least a first mode ranking and a second mode ranking responsive to one or more categorical attributes of a first item and to one or more payment mode use constraints comprises:
 a processor arranged to receive the one or more categorical attributes of the first item.

19. The system of claim 1, in which the processor for obtaining at least a first mode ranking and a second mode ranking responsive to one or more categorical attributes of a first item and to one or more payment mode use constraints comprises:
 a processor arranged to include a product-dependent constraint in the one or more payment mode use constraints.

20. The system of claim 1, in which the processor for obtaining at least a first mode ranking and a second mode ranking responsive to one or more categorical attributes of a first item and to one or more payment mode use constraints comprises:
 a processor arranged to include a provider-dependent constraint in the one or more payment mode use constraints.

21. The system of claim 1, in which the processor for obtaining at least a first mode ranking and a second mode ranking responsive to one or more categorical attributes of a first item and to one or more payment mode use constraints comprises:
 a processor arranged to apply the one or more payment mode use constraints to a description of the first item.

22. The system of claim 1, in which the processor for obtaining at least a first mode ranking and a second mode ranking responsive to one or more categorical attributes of a first item and to one or more payment mode use constraints comprises:
 a transmitter arranged to transmit a first component and a second component of the first item, responsive to an indication of a user input.

23. The system of claim 1, in which the processor for obtaining at least a first mode ranking and a second mode ranking responsive to one or more categorical attributes of a first item and to one or more payment mode use constraints comprises:
 a processor arranged to spawn a second item from the first item, responsive to an indication of a user input.

24. The system of claim 1, in which the processor for obtaining at least a first mode ranking and a second mode ranking responsive to one or more categorical attributes of a first item and to one or more payment mode use constraints comprises:
 a processor arranged to receive at least the first mode ranking and the second mode ranking from a network.

25. The system of claim 1, in which the processor for obtaining at least a first mode ranking and a second mode ranking responsive to one or more categorical attributes of a first item and to one or more payment mode use constraints comprises:
 a processor arranged to update at least one of the one or more payment mode use constraints, responsive to an indication of a user input.

26. The system of claim 1, in which the processor for obtaining at least a first mode ranking and a second mode ranking responsive to one or more categorical attributes of a first item and to one or more payment mode use constraints comprises:
 circuitry for including in a common image a type identification of the first item and a type identification of a second item.

27. The system of claim 1, in which the processor for obtaining at least a first mode ranking and a second mode ranking responsive to one or more categorical attributes of a first item and to one or more payment mode use constraints comprises:
 circuitry for receiving an indication of a user actuation of a control;
 circuitry for modifying at least one of the first mode ranking or the second mode ranking, responsive to the actuation;
 circuitry for obtaining at least the first mode ranking and the second mode ranking by applying an updated ranking model;
 circuitry for receiving an update of at least one of the first payment mode or the first item;
 circuitry for receiving the one or more categorical attributes of the first item;
 circuitry for including a product-dependent constraint in the one or more payment mode use constraints;
 circuitry for including a provider-dependent constraint in the one or more payment mode use constraints;
 circuitry for applying the one or more payment mode use constraints to a description of the first item;
 circuitry for transmitting a first component and a second component of the first item, responsive to an indication of a user input;
 circuitry for including in a common image a type identification of the first item and a type identification of the second item;
 circuitry for spawning a second item from the first item, responsive to the indication of the user input;
 circuitry for receiving at least the first mode ranking and the second mode ranking from a network; and
 circuitry for updating at least one of the one or more payment mode use constraints, responsive to the indication of the user input.

28. The system of claim 27, in which the processor for transmitting at least an indication of a first payment mode responsive to at least the first mode ranking or the second mode ranking comprises:
 circuitry for indicating the first item, the second item, the first payment mode, and a second payment mode via the common image;
 circuitry for transmitting the indication of the first payment mode to a display;
 circuitry for transmitting an authorization to use the first payment mode;
 circuitry for receiving via a wireless linkage the common image containing at least the indication;
 circuitry for dissociating the first item from the first payment mode, responsive to the indication of the user input;
 circuitry for displaying a control in a grid cell, the grid cell indicating an association between the first payment mode and the first item;
 circuitry for indicating one or more criteria for validating a payee of the first item;
 circuitry for transmitting a first message including at least the indication of the first payment mode and a representation of a value of a discount in the first item;
 circuitry for transmitting a second message including at least a quantitative attribute of the first payment mode as the indication of the first payment mode; and
 circuitry for displaying at least the indication of the first payment mode via a portable device.

29. The system of claim 1, in which the transmitter arranged to transmit at least an indication of a first payment mode responsive to at least the first mode ranking or the second mode ranking comprises:
 a processor arranged to indicate the first item, the second item, the first payment mode, and a second payment mode via the common image;
 a transmitter arranged to transmit an authorization to use the first payment mode;

a display arranged to display a control in a grid cell, the grid cell indicating an association between the first payment mode and the first item;

a processor arranged to evaluate one or more criteria for validating a payee of the first item;

a transmitter for transmitting a message including at least a quantitative attribute of the first payment mode as the indication of the first payment mode;

a transmitter for transmitting at least the indication of the first payment mode to a user interface; and a receiver for receiving a heterogeneous payment authorization via the user interface.

* * * * *